March 29, 1955
M. C. ADDICKS
2,705,126
POWER SHOVEL MACHINE
Filed June 29, 1953
8 Sheets-Sheet 1
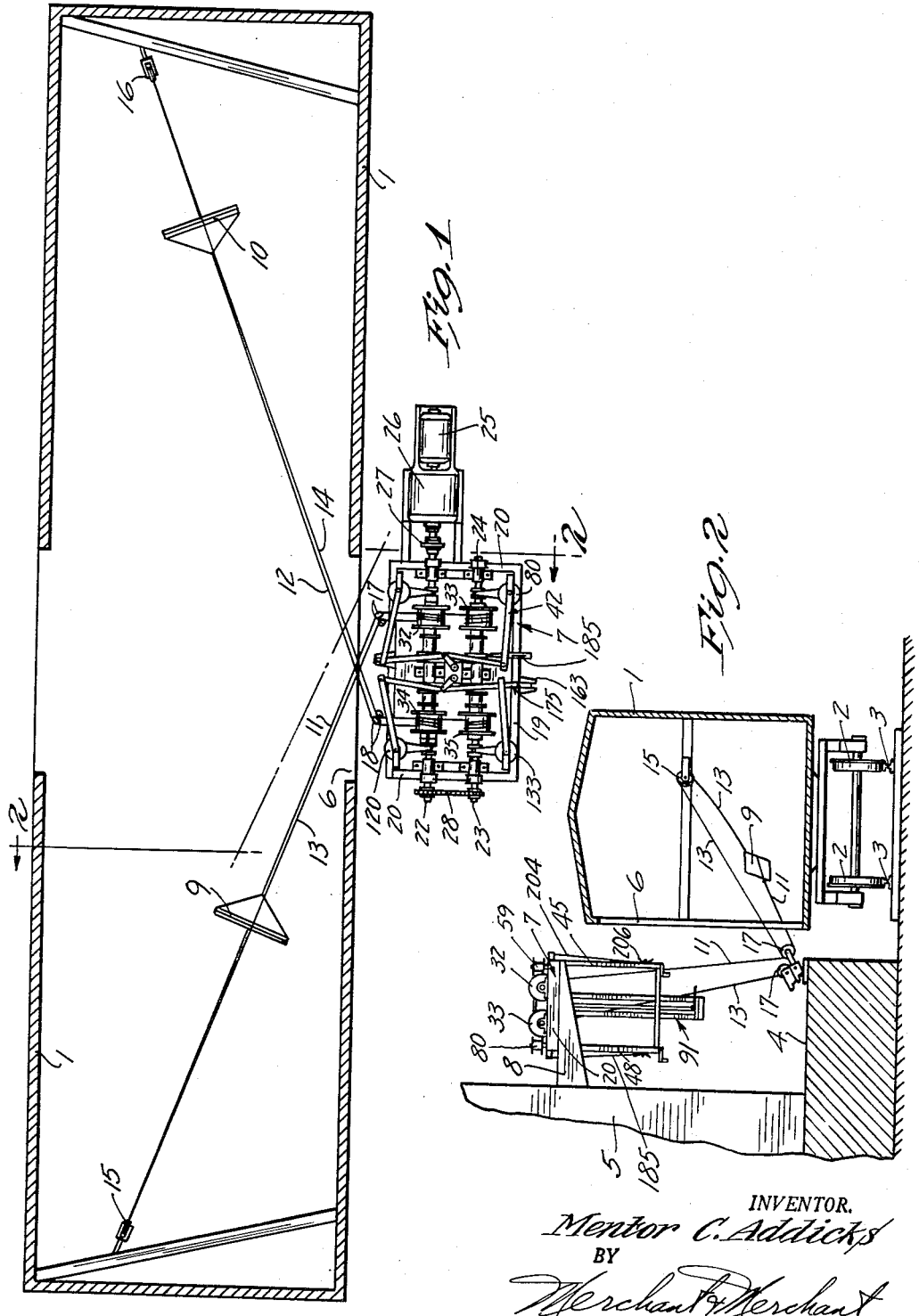
INVENTOR.
Mentor C. Addicks
BY
Merchant & Merchant
ATTORNEYS

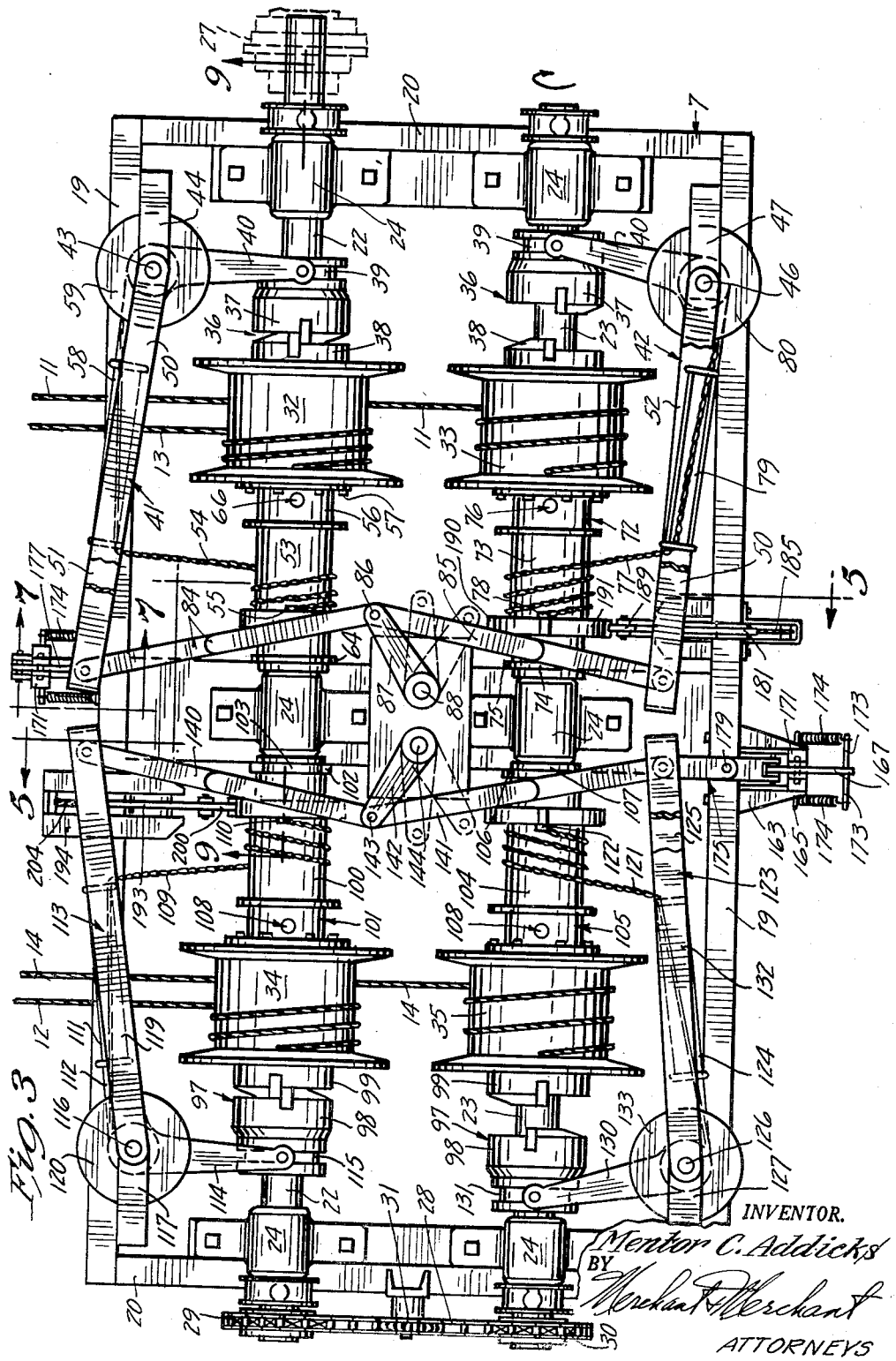

March 29, 1955
M. C. ADDICKS
2,705,126
POWER SHOVEL MACHINE
Filed June 29, 1953
8 Sheets-Sheet 3
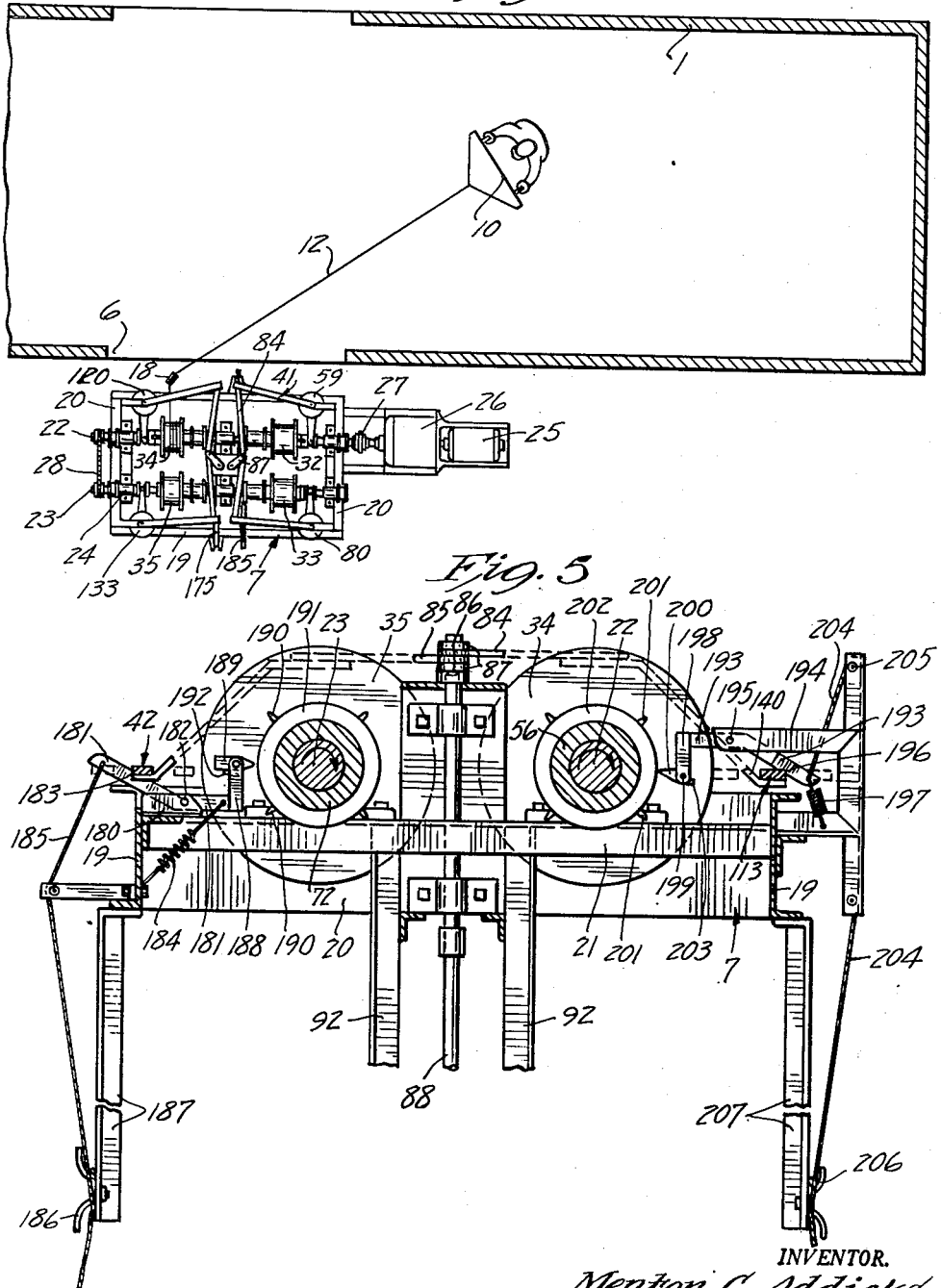
INVENTOR.
Mentor C. Addicks
BY
Merchant & Merchant
ATTORNEYS

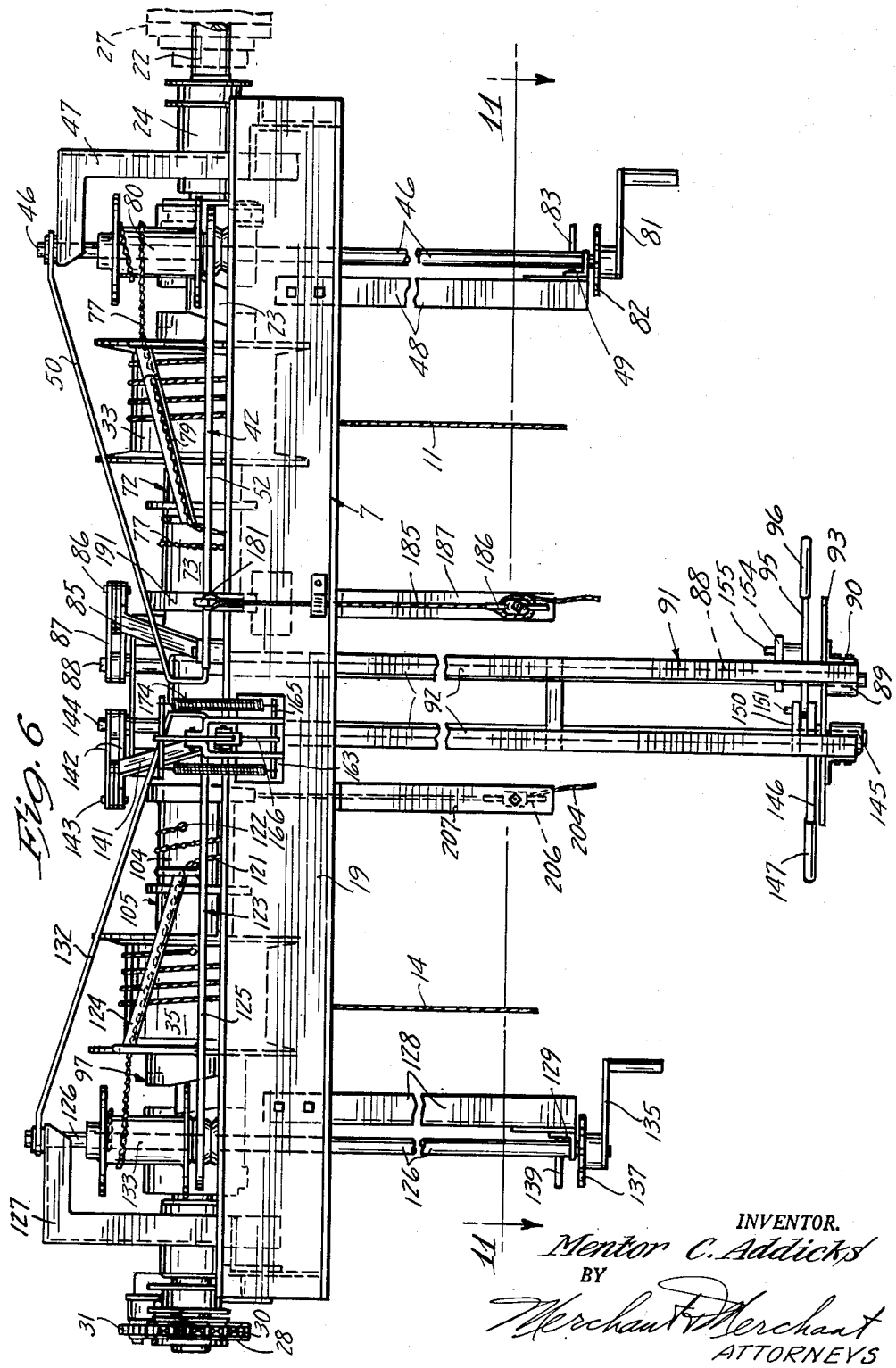

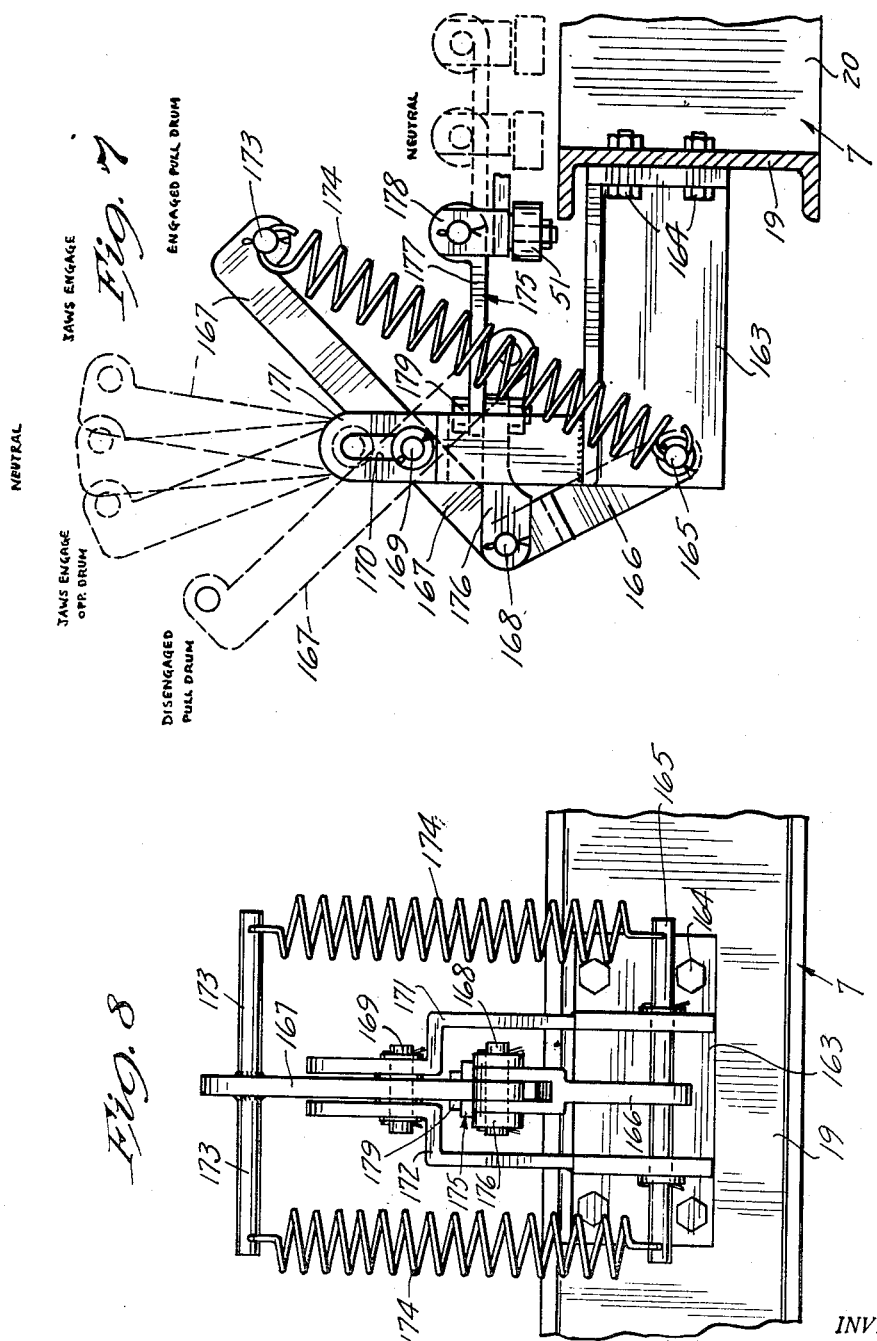

March 29, 1955
M. C. ADDICKS
2,705,126
POWER SHOVEL MACHINE
Filed June 29, 1953
8 Sheets-Sheet 6
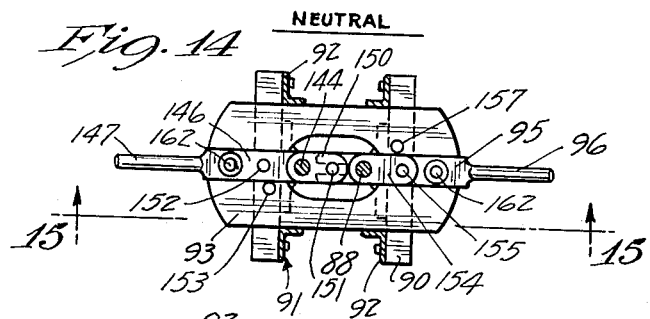
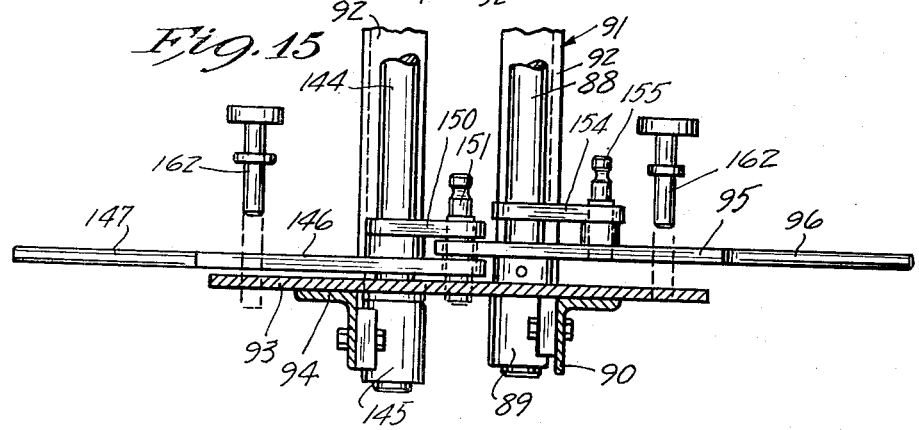
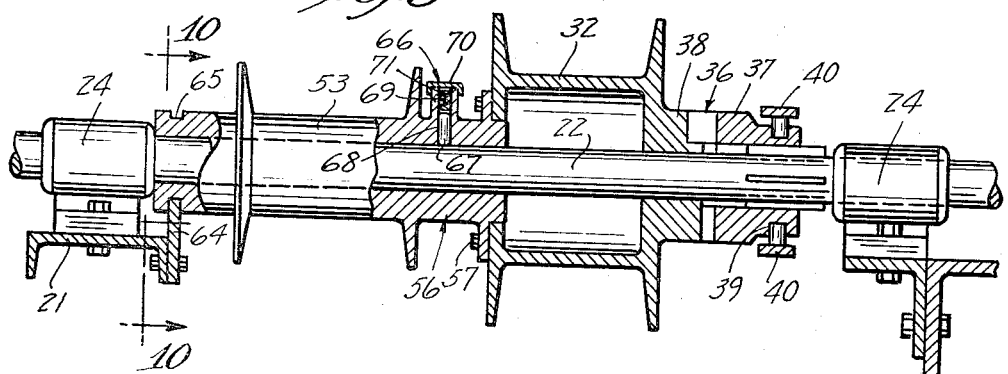
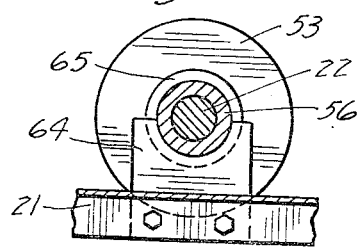
INVENTOR.
Mentor C. Addicks
BY
Merchant & Merchant
ATTORNEYS

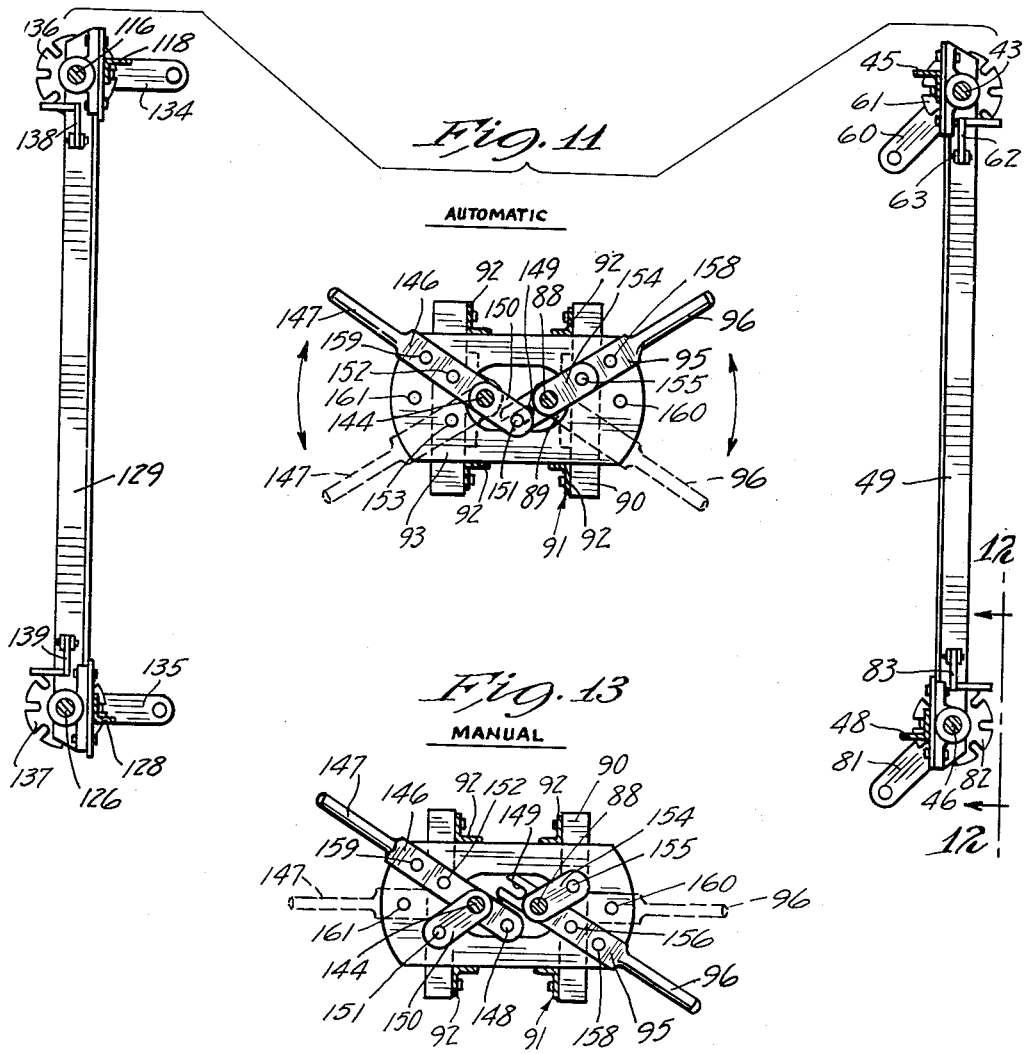

March 29, 1955     M. C. ADDICKS     2,705,126
POWER SHOVEL MACHINE
Filed June 29, 1953     8 Sheets-Sheet 8
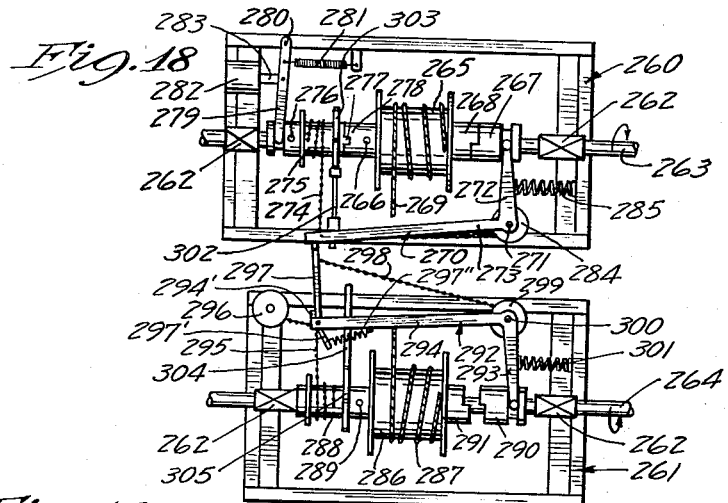
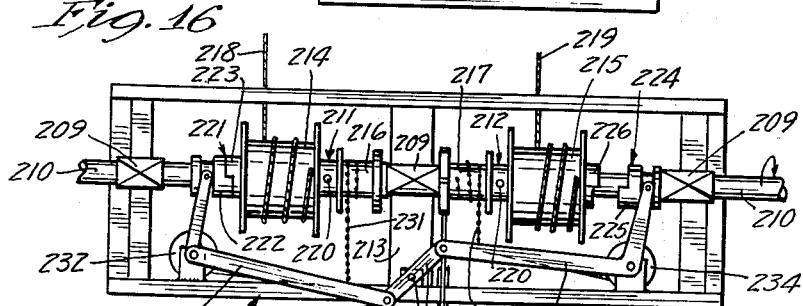
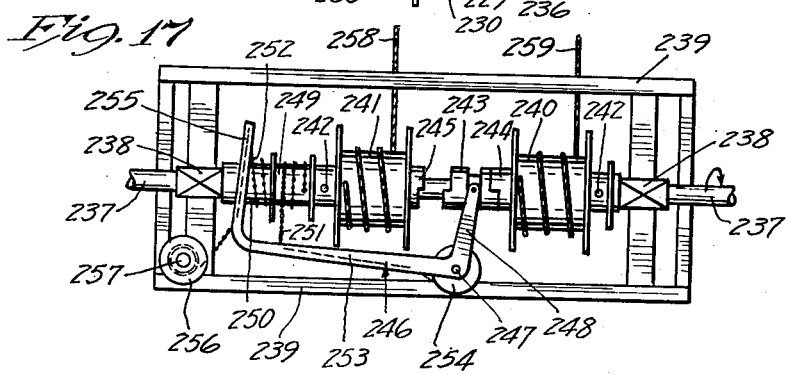
INVENTOR.
Mentor C. Addicks
BY
Merchant & Merchant
ATTORNEYS

United States Patent Office 2,705,126
Patented Mar. 29, 1955

2,705,126
POWER SHOVEL MACHINE

Mentor C. Addicks, Minneapolis, Minn.

Application June 29, 1953, Serial No. 364,903

37 Claims. (Cl. 254—173)

My invention relates generally to machines for handling granular or bulk material and more specifically to improved mechanism for unloading granular material from freight cars, storage bins and the like.

An important object of my invention is the provision of a winding drum having a material handling scoop-equipped cable wound thereon and of novel means for controlling rotation of the winding drum and consequently the movement of the scoop or shovel carried by the cable wound thereon.

Another important object of my invention is the provision of novel means whereby the pair of cooperating cable winding drums are unlocked for simultaneous rotation whereby a scoop carried by a cable having its opposite ends adapted to be wound on the winding drums may be automatically moved between predetermined limits.

Another object of my invention is the provision of a machine as above mentioned wherein the amount of travel of the scoop in opposite directions may be controlled during operation of the machine.

A still further object of my invention is the provision of means whereby one of the above mentioned drums may be instantly released from cooperation of the other thereof so that the scoop carried by said cable may be moved by the said other drum in one direction and manually moved in the opposite direction.

Still another object of my invention is the provision of two pairs of winding drums of the above type and of novel linkage connecting the control elements of said pairs of drums whereby both pairs may be utilized simultaneously to empty opposite end portions of bins or freight cars, and means for releasing said linkage whereby one pair of drums may be operated independently of the other pair.

Another object of my invention is the provision of a cable winding drum journalled on a power driven rotary shaft, a low torque transfer coupling urging the drum in the direction of rotation of the shaft but permitting rotation thereof in the opposite direction whereby to prevent backlash when cable is being unwound from the drum in a direction opposite to the direction of rotation of the shaft, and of releasable high torque transfer coupling means connecting the drum to said shaft for common rotary movement in a cable winding direction.

Still another object of my invention is the provision of a pair of cable winding drums journalled on power driven shaft means and driven by said shaft means through individual clutches, actuators for said clutches, means for controlling said actuators and of novel mechanism for adjusting said control mechanism whereby to vary the amount of winding rotation of said drums.

Another object of my invention is the provision of a machine as immediately above described which is provided with novel linkage connecting the clutch actuators of said drums, whereby when one of said clutches is rendered inoperative the actuators associated with the other clutch is moved in a direction to render its clutch operative and means urging said other clutch actuator in a direction to render its clutch operative.

Another object of my invention is the provision of a shoveling machine as set forth which is relatively simple to manufacture and install, which is highly efficient in operation and which is extremely rugged in construction and durable in use.

The above and still further highly important objects and advantages of my invention will become apparent from the following detailed specification, appended claims and attached drawings.

Referring to the drawings, which illustrate the invention, and in which like characters indicate like parts throughout the several views:

Fig. 1 is a diagrammatic view partly in plan and partly in horizontal section illustrating a preferred embodiment of my improved shoveling machine and its use in unloading a freight car or the like;

Fig. 2 is a vertical section taken substantially on the line 2—2 of Fig. 1;

Fig. 3 is an enlarged view in plan of my novel shoveling mechanism, some parts being broken away;

Fig. 4 is a fragmentary view corresponding to Fig. 1 illustrating the use of my invention in the manual "clean-up" operation of my shoveling machine;

Fig. 5 is a transverse section taken substantially on the line 5—5 of Fig. 3;

Fig. 6 is a view in side elevation of the machine of Fig. 3, some parts being broken away;

Fig. 7 is an enlarged fragmentary view partly in elevation and partly in section taken substantially on the line 7—7 of Fig. 3;

Fig. 8 is a fragmentary view in side elevation as seen from the left to the right with respect to Fig. 7;

Fig. 9 is a fragmentary view in axial section taken substantially on the line 9—9 of Fig. 3;

Fig. 10 is a transverse section taken on the line 10—10 of Fig. 9;

Fig. 11 is a horizontal section taken substantially on the line 11—11 of Fig. 6;

Fig. 12 is an enlarged fragmentary detail as seen from the line 12—12 of Fig. 11, some parts being broken away and some parts being shown in section;

Fig. 13 is a view corresponding to a portion of Fig. 11 but showing a different arrangement of some of the parts;

Fig. 14 is a view corresponding to Fig. 13 but showing a still different arrangement of some of the parts;

Fig. 15 is an enlarged vertical section taken on the line 15—15 of Fig. 14;

Fig. 16 is a view corresponding to Fig. 3 on a reduced scale illustrating a modified form of the invention;

Fig. 17 is a view in plan showing a further modification; and

Fig. 18 is a view in plan showing a still further modified form of the invention.

In the preferred embodiment of the invention illustrated in Figs. 1 to 15 inclusive, and particularly with reference to Figs. 1, 2 and 4, a conventional boxcar or the like 1 is illustrated as being provided with wheels 2 resting upon rails 3 at one side of a receiving platform 4 of a grain elevator or the like 5. The receiving platform 4 is of the usual structure and is adapted to receive granular material such as grain or the like from the car 1 as the grain is shoveled or otherwise moved through the customary opening 6 in the side of the car at its central portion. A frame structure 7 is shown in Fig. 2 as being mounted on a bracket 8 rigidly secured to the building structure 5. The frame structure 7 carries mechanism for imparting reciprocatory grain shoveling and return movements to one or a pair of scoops or shovels 9 and 10 each of which are adapted to be moved between an opposite end portion of the car 1 and the intermediate door opening 6 thereof. The shovels 9 and 10 are of the type commonly used to move grain or like bulk material from a grain bin or as shown unloading grain or like material from a boxcar. The scoops 9 and 10 are each connected to the shoveling machine on the frame structure 7 for movements in a car unloading direction by flexible cables 11 and 12 respectively and to the shoveling machine for return movements by return cables 13 and 14 respectively that run over tail sheaves 15 and 16 shown diagrammatically in Figs. 1 and 2. These tail sheaves are of the type commonly used for this purpose and may be secured to either end portion of the car in any suitable and well-known manner. The cables 11 and 12 will hereinafter be designated as pull forward cables and the cables 13 and 14 as return cables.

Preferably and as illustrated in Fig. 2, the shoveling machine in the frame structure 7 is mounted above the level of the door opening 6 of the boxcar 1. For guiding the pull forward and return cables together with the scoops or shovels 9 and 10 I provide pairs of pulleys 17 and 18 the former of which guide the pull forward and return cables 11 and 13 and the latter of which guide the pull forward and return cables 12 and 14 respectively. As shown in Fig. 2, the pulleys 17 and 18 are anchored to the loading platform 4.

The frame structure 7 is generally rectangular in form and comprises spaced side members 19, end members 20 and a transverse central cross-member 21. A pair of shafts 22 and 23 are journalled in suitable bearings 24 mounted on the end frame members 20 and the transverse central member 21 in spaced parallel relationship. The shaft 22 is driven from a suitable source of power such as an electric motor 25 through a conventional gear reducer 26 and a coupling 27. Rotation is imparted to the shaft 23 from the shaft 22 by an endless link chain 28 running over a sprocket 29 fast on one end of the shaft 22 and another sprocket wheel 30 fast on the adjacent end of the shaft 23. An idler sprocket 31 suitably journalled on the adjacent end frame member 20 maintains the link chain 28 in a desired taut condition. Journalled for rotation on the shafts 22 and 23 adjacent one end of the frame structure 7 is a pair of winding drums 32 and 33. The pull forward cable 11 associated with the scoop 9 is adapted to be wound upon the drum 33, whereas the return cable 13 is adapted to be wound upon the winding drum 32, see Fig. 3. A second pair of winding drums 34 and 35 are journalled respectively on the shafts 22 and 23 in axially spaced relation to the winding drums 32 and 33 respectively. The pull forward cable 12 is adapted to be wound upon the winding drum 34 whereas the return cable 14 is adapted to be wound upon the winding drum 35. With reference to Fig. 3 it will be seen that the cables 11 to 14 inclusive are wound on their respective winding drums in the same direction and that all of said winding drums rotate in the same direction to wind said cables thereon.

The winding drums 32 and 33 are adapted to be driven from their respective shafts 22 and 23 by releasable high torque transfer couplings in the nature of identical clutches 36 each comprising a driving element 37 and a driven element 38, the former of which are splined or otherwise secured to their respective shafts 22 and 23 for common rotation therewith and for axial sliding movements with respect thereto, see Fig. 9, and the latter of which are integrally formed with their respective winding drums 32 and 33. The clutch elements 37 are formed to provide circumferential channels 39 for the reception of the inner bifurcated ends 40 of actuators in the nature of bell crank levers 41 and 42 the former of which is operatively associated with the winding drum 32 and the latter of which is operatively associated with the winding drum 33. The bell crank 41 is pivotally mounted on the upper end portion of a vertically extended shaft 43 that is journalled at its upper end in an upstanding bracket 44 welded or otherwise rigidly secured to the frame structure 7, and at its lower end in a depending bracket 45 bolted to one of the side frame members 19. The lever 42 is pivotally secured intermediate its ends to a similar shaft 46 that is journalled at its upper end in an upstanding bearing bracket 47 and at its lower end in a depending bracket 48, said brackets 47 and 48 being similar to the brackets 44 and 45 respectively. With respect to Figs. 6 and 11, it will be seen that the depending brackets 45 and 48 are connected by a brace member 49. The bell crank levers 41 and 42 are strengthened by identical diagonal brace members 50 that extend from the outer ends of their respective lever arms 51 and 52 to the upper ends of the shafts 43 and 46 respectively.

Connected to the winding drum 32 for common rotation therewith is a control drum 53 on which is wound the inner end portion of an elongated flexible control member in the nature of a link chain 54. The inner end of the link chain 54 is anchored to the control drum 53 by a screw or bolt 55. The control drum may be connected to the winding drum 32 by any suitable means but preferably, and as shown in Fig. 9, is formed to provide the central portion of a sleeve 56 that is bolted or otherwise rigidly secured to one end of the drum 32 as at 57. The link chain 54 extends through and is carried by a support 58 on the lever arm 51 and has its opposite end portion wound on a spool 59 that is mounted fast on the shaft 43 for common rotation. At its lower end, the shaft 43 is provided with a manually operated crank 60 to which is secured a toothed wheel 61. Rotation of the crank 60 in one direction will cause the link chain 54 to be wound upon the spool 59 whereby to shorten the effective length thereof between the lever 51 and the end of the chain 54 wound on the control drum 53. Obviously rotation of the crank 60 in the opposite direction will cause the chain 54 to be effectively lengthened between the lever 51 and the control drum 53, all for a purpose which will hereinafter become apparent. A latch 62 is pivotally secured to the brace member 49 as indicated at 63 and is adapted to be moved into engagement with the toothed wheel 61 whereby to releasably lock the same in any desired set position.

Rotation of the winding drum 32 in a cable unwinding direction will also cause the chain 54 to become unwound from the control drum 53. As the chain 54 unwinds from the control drum 53 it will depend in an open loop between the control drum 53 and the lever arm 51. However, when the clutch 36 associated with the winding drum 32 is rendered operative, the drums 32 and 53 will be rotated in a cable and chain winding direction. Then, sufficient chain 54 has been wound upon the control drum 53 to cause the portion thereof between the control drum and lever arm to become taut, the lever 41 will be moved by the tightening chain in a counterclockwise direction with respect to Fig. 3 so as to cause disengagement between the clutch elements 37 and 38 of the clutch 36 associated with the winding drum 32 and thus stop rotation of the winding drum 32 and control drum 53. For the purpose of holding the winding drum 32 and its associated control drum 53 against axial movement on the shaft 22, I provide a keeper plate 64 that is bolted or otherwise anchored to one side of the frame member 21. The keeper plate 64 rides in a circumferentially extended groove 65 in the inner end portion of the sleeve 56, see particularly Figs. 9 and 10.

A low torque transfer coupling indicated in its entirety at 66 comprises a friction plug 67 that is axially slidable in a radially extended passage 68 in the sleeve 56 between the winding drum 32 and the control drum 53. The passage 68 extends radially outwardly through a boss 69 formed in the sleeve 56 and has screw threaded or otherwise anchored thereto a cover or cap 70 between which and the friction plug 67 is interposed a coil compression spring 71 which urges the plug 67 into frictional engagement with the underlying portion of the shaft 22. The low torque transfer coupling is operative when the clutch 36 associated with the drum 32 is inoperative, to tend to rotate the winding drum 32 in the direction of rotation of the shaft 22. When cable 11 is being wound upon the winding drum 33, return cable 13 is caused to be unwound from the winding drum 32. During this time the low torque transfer coupling 66 operates to maintain the return cable 13 in a relatively taut condition and prevents overrunning of the winding drum 32 in a cable unwinding direction and backlash of the return cable 13 thus reducing possibility of breakage of either the cables 11 or 13 and insuring smooth operation of the machine.

The construction of the winding drum 33 and its associated parts is identical to that of the drum 32, the drum 33 being provided with a sleeve-like member 72 formed to provide a control drum 73 and a peripheral groove 74 in which is received a keeper plate 75 identical to the keeper plate 64. The sleeve 72 is also provided with a low torque transfer coupling 76 identical to the coupling 66 associated with the sleeve 56. An elongated flexible member 77 consists of a link chain having its inner end portion adapted to be wound upon the control drum 73 and anchored at its extreme inner end thereto as indicated at 78. Intermediate its ends, the chain 77 engages and is carried by a chain support 79 on the lever arm 52, and extends therethrough, having its outer end portion wound on a spool 80 fast on the shaft 46. The spool 80 is identical to the spool 59 and is rotated in opposite directions to vary the effective length of the chain 77 between the lever arm 52 and the control drum 73 by a crank 81 fast on the lower end of the shaft 46. The crank 81 is provided with a toothed locking plate 82 identical to the plate 61, and which is adapted to be locked in desired set position by a latch 83 identical to the latch 62.

With the above arrangement it will be seen that the amount of rotation of either winding drum 32 or 33 prior to disengagement of their respective clutches may be varied, whereby to lengthen or shorten the length of travel of the material handling scoop or shovel 9 associated therewith. In other words, the extent of travel of the scoop 9 in either direction may be varied by manipulation of the cranks 60 and 81. Means for rendering one of the clutches 36 operative responsive to disengagement of the clutch elements of the other clutch 36 includes linkage comprising a pair of rigid links 84 and 85 pivotally connected together at their inner ends as indicated at 86 and to the outer end of a crank arm 87 which at its inner end is rigidly secured to the upper end of a vertical rock shaft 88 journalled in the frame structure 7 and extending downwardly through the central frame member 21 thereof. The lower end portion of the shaft 88 is journalled in a bearing 89 that is secured to a cross member 90 which forms the lower end of a generally rectangular depending support 91 made up of a plurality of, as shown at 4, depending angle bars 92 rigidly secured at their upper ends to the transverse frame member 21. A generally horizontal indexing or control plate 93 rests upon the cross member 90 and another cross member 94 laterally spaced from the member 90 and joining the lower ends of a different pair of the depending members 92, see particularly Figs. 11 and 13 to 15 inclusive. The control plate 93 is preferably welded to the cross bars 90 and 94 to provide a rigid structure. A control lever 95 is pinned or otherwise anchored to the shaft 88 directly above the control plate 93 and terminates at its outer end in a handle 96.

The machine above described is capable of automatically removing all but a very small portion of granular material between the intermediate doors at one end of the boxcar. For the purpose of unloading the other end portion of the car simultaneously with the first end, I provide the winding drums 34 and 35 together with their respective cables 12 and 14 and shovel or scoop 10. The winding drums 34 and 35 are provided with associated mechanism identical to the above described in connection with the winding drums 32 and 33 except that the mechanism associated with the drums 34 and 35 is left hand. Thus the winding drums 34 and 35 are driven from their respective shafts 22 and 23 by clutches 97 comprising cooperating driving elements 98 which are splined or otherwise secured to their respective shafts for common rotation therewith and for axial sliding movements with respect thereto, and driven elements 99 integrally formed with their respective winding drums 34 and 35. A control drum 100 is formed as part of a sleeve 101 rigidly secured to the winding drum 34 and held therewith against axial movement on the shaft 22 by a keeper plate 102 having one edge riding in a circumferentially extended groove 103 in the inner end portion of the sleeve 101. Likewise a control drum 104 forms part of a sleeve-like member 105 bolted or otherwise rigidly secured to the winding drum 35 and is held against axial movement on the shaft 23 by a keeper plate 106, one edge of which is contained within a circumferentially extended channel 107 in the inner end portion of the sleeve 105. The sleeves 101 and 105 are each provided with a low torque transfer coupling 108 identical to the above described low torque transfer coupling 66. Means for disengaging the clutch elements 98 and 99 of the winding drum 34 includes a link chain 109 which has its inner end portion wound on the control drum 100 and anchored thereto as indicated at 110. The intermediate portion of the link chain 109 engages and is carried by a chain support 111 on one arm 112 of an actuator lever indicated in its entirety at 113. The other arm 114 of the lever 113 is bifurcated to engage diametrically opposite portions of a circumferentially extended channel or groove 115 in the associated clutch member 98. The lever 113 is pivotally secured to a vertically extended shaft 116 journalled in an upwardly extended bracket 117 fast on the adjacent frame member 19 and its lower end of a supporting leg 118 depending from the frame 7. The actuator lever 113 further comprises a brace member 119 extending diagonally upwardly from the free end of the lever arm 112 to the shaft 116 above the mounting bracket 117, see Figs. 3 and 6. The outer end portion of the link chain 109 is wound upon a spool 120 that is fast on the shaft 116. The spool 120 is identical to the spools 59 and 80 and performs a like function with respect to its associated parts. In a manner like to the above an elongated flexible member in the nature of a link chain 121 has its inner end portion wound on the control drum 104 and anchored thereto as indicated at 122. The chain 121 engages an actuator lever 123 and is carried by a chain support 124 on one lever arm 125 of the lever 123. Said lever 123 comprises a bell crank journalled at its intermediate portion on the upper end portion of a vertically extended shaft 126 which is journalled at its upper end in a bearing bracket 127 and at its lower end in a bearing mounted on the lower end of a depending leg 128. The lower ends of the legs 118 and 128 are connected by a brace member 129 similar to the brace member 49. The other arm 130 of the lever 123 is bifurcated and has its free ends received in a circumferentially extended groove or channel 131 in the movable clutch element 98 associated with the winding drum 35. A brace member 132 extends diagonally upwardly from the outer end of the lever arm 125 and is journalled on the shaft 126 above the bracket 127 thereof. The outer end of the flexible chain 121 is wound on a spool 133 fast on the shaft 126 between the lever arm 125 and the bracket 127 and is identical to the spools 59, 80 and 120 in its operation. Means for winding or unwinding the spools 120 and 133 includes a pair of cranks 134 and 135 fast on the shafts 116 and 126 respectively. Also fast on said shafts are a pair of toothed plates 136 and 137 respectively that are engageable by respective latches 138 and 139 to lock the spools against rotation.

Means for connecting the free ends of the lever arms 112 and 125 together for common movements in opposite directions includes linkage comprising a pair of rigid links 140 and 141 that are pivotally secured together and to the outer end of a crank arm 142 as indicated at 143. The crank arm 142 is rigidly anchored to the upper end of a rock shaft 144 that extends vertically through the cross member 21 of the frame structure 7 in spaced parallel relation to the rock shaft 88 and which is journalled at its lower end in a bearing 145 secured to the member 94 at the lower ends of one of the pairs of legs 92 and below the control plate 93. A control lever 146 is mounted fast on the shaft 144 in overlying relation to the control plate 93 and is formed at its outer end to provide a handle 147, see particularly Figs. 11 and 13 to 15 inclusive. With reference to Fig. 16 it will be seen that the control lever 95 for the winding drums 32 and 33 lies in a plane vertically spaced from the plane of the control lever 146. Thus, when the full machine is in operation, swinging movement of one of the lever arms 95 or 146 will not interfere with free swinging movement of the other thereof.

From the above it should be obvious that the two portions of my machine above described are utilized to empty opposite end portions of a boxcar or the like, the link chains of one of the winding drums will upon being sufficiently wound upon its control drum move its associated actuator lever to disengage the high torque transfer coupling or clutch associated therewith. This movement of the actuator lever will cause corresponding movement to be imparted to the actuator lever for the cooperating winding drum through the linkage associated with the free ends of the actuator levers to render the clutch associated therewith operative to move its respective scoop in the opposite direction. I further provide releasable means, now to be described, for interlocking the rock shafts 88 and 144 for common movements in opposite directions whereby to further control operation of the full machine including both sets of winding drums 32 to 35 inclusive. With reference to Figs. 11 and 13 to 15 inclusive, it will be seen that the inner end of the control lever 146 is provided with an aperture 148 whereas the inner end of the control lever 95 is provided with a slot 149 that is registrable with the aperture 148. Mounted for rotation and axial sliding movements on the rock shaft 144 is a locking bar 150 having a locking pin 151 anchored at its free end and extending in a direction parallel to the rock shaft 144. The locking bar 150 is movable to and from a position wherein the pin 151 may be inserted through the aperture 148 and the slot 149 whereby rock shaft imparted rocking movements of one of the control levers will cause like rocking movements of the other thereof. When the flexible member of one of the control drums becomes wound upon its control drum sufficiently to move its associated actuator lever, the actuator lever of the unwinding drum associated therewith will be moved thereby through the linkage. The rock shafts 88 and 144 and the connected control levers 95 and 146 will simultaneously be moved to disengage the clutch of the other winding drum and cause engagement of the clutch of its associated unwinding drum irrespective of the amount of chain which has been wound upon the control drum associated with the other winding drum. From the above it should be obvious that, when the linkages are interlocked by the control levers 95 and 146, the operation of both machines may be controlled by a single pair of flexible members on the control drums. For instance, the spools 120 and 133 may be unwound to a point where the link chains 109 and 121 thereof will have a greater effective length between their control drums and actuator levers than the link chains 54 and 77 between their associated control drums and actuator levers. Thus, the entire operation will be dependent upon the control drums 53 and 73 and their respective flexible members or chains 54 and 77 respectively.

The locking bar 150 may be moved rotatably with respect to its cooperating control lever 146 so that the locking pin 151 thereof may be placed in an opening 152 in the lever 146 or in a similar opening 153 in the control plate 93 for a purpose which will hereinafter become apparent. A similar locking bar 154 is rotatably and axially slidably mounted on the rock shaft 88 and at its outer end is provided with a locking pin 155 which is insertable selectively in an opening 156 in the control lever 95 or a similar opening 157 in the control plate 93, see Figs. 11 and 13 to 15 inclusive. The control levers 95 and 146 are each provided with other openings 158 and 159 that are alignable with respective openings 160 and 161 in the control plate 93 whereby headed locking pins or the like 162 may be inserted to lock either or both control levers 95 and 146 in a position wherein the clutches 36 or 97 associated therewith are held in inoperative positions. It should be noted that, when the pin 151 is contained in the aperture 148 of the control lever 146 and in the slot 149 of the control lever 95, with the pin 155 of the locking bar 154 contained in the opening 156 of the control lever 95, that the machine is in condition for automatic operation to remove granular material from both ends of the boxcar 1 simultaneously. Such operation may be summarized as follows:

With the motor 25 imparting continuous and uninterrupted rotation to the drive shafts 22 and 23 and the tail sheaves 15 and 16 anchored to the opposite ends of the boxcar in a conventional manner, the cranks 60, 81, 134 and 135 are manipulated to provide the correct effective length of their respective link chains 54, 77, 109 and 121 to provide for tripping of their respective clutches when the scoops or shovels 9 and 10 arrive at predetermined positions both in their forward and return movements. In other words, said link chains are set to lengths which determine the length of travel of the scoops 9 and 10. It should be assumed that, at the beginning of the operation, the control levers 95 and 146 are in their neutral position of Fig. 14. Movement of the interlocked or interconnected control levers 95 and 146 to their full line position of Fig. 11 will cause the clutch elements 37 and 38 associated with the drum 32 and the clutch elements 98 and 99 associated with the winding drum 34 to be engaged whereby to initiate winding of the pull forward cable 12 and the return cable 13 on their respective winding drums 34 and 32. The scoop 10 will travel toward the door opening 6 of the boxcar while the scoop 9 is making a return run toward the adjacent end of the boxcar 1. During this time the chains 54 and 109 are being wound upon their respective control drums 53 and 100. When one of said chains 54 or 109 is wound sufficiently upon its control drum to take up all of the slack therebetween and its associated actuator lever 41 or 113, said actuating lever will be moved thereby in a direction to cause disengagement of the clutch elements associated therewith. This movement of the actuator lever is transmitted through the several links 84, 85, 140 and 141, the crank arms 87 and 142, the rock shafts 88 and 144 and the interconnected control members 95 and 146 to the actuator levers and clutch elements of the other drums so that the clutches of the winding drums 32 and 34 will simultaneously become disengaged and the clutches of the drums 33 and 35 will become engaged thus reversing the travel of the scoops 9 and 10. During the initial part of the operation, the extent of travel of the scoops 9 and 10 does not extend to the extreme ends of the boxcar for the reason that the scoops would become overloaded. However, as material is delivered from the central portion of the boxcar by the scoops, the adjusting cranks 81 and 134 may be rotated in a direction to increase the effective length of the link chains 77 and 109 whereby to extend the limits of return travel of the scoops 9 and 10 toward opposite ends of the boxcar. Obviously, engagement of the clutch elements of the winding drums 33 and 35 will cause a reversal of travel of the scoops 9 and 10 until one of the link chains 77 or 121 is wound upon its corresponding control drum 73 or 104 to move its associated actuator lever in a direction to disengage the clutch elements thereof. This cycle is automatically repeated until the control levers 95 and 146 are manually moved to their neutral position of Fig. 14. During this automatic operation, the low torque transfer couplings associated with each winding drum sets up sufficient drag between the free running winding drums and their drive shafts so that, when the scoops reach one limit of travel, there is no overrunning of the unwinding drums and no slack occurs in any of the cables as they are paid out, consequently backlash in the cable is avoided and smoothness of reversal in the direction of travel of the scoops 9 and 10 is insured.

It should further be noted that two scoops 9 and 10 may be operated automatically but independently of each other by merely removing the pin 151 from disengagement with the opening 148 and the slot 149 and rotating the locking bar 150 so that the pin 151 is contained in the opening 152 of the control lever 146. The control levers 95 and 146 are then independent of each other and the portion of the machine containing the drums 32 and 33 may be operated as a complete machine independently of that portion comprising the winding drums 34 and 35 with their associated parts.

The several actuator levers 41, 42, 113 and 123, during the automatic operating of my novel shoveling machine, each moves through a so-called neutral zone or position between extreme positions wherein the clutch of one winding drum is fully engaged and wherein the clutch of an associated winding drum is totally disengaged. When an actuating lever is in this neutral zone, its associated clutch together with the clutch associated with the actuating lever connected thereto by their cooperating linkage is disengaged. Under some conditions of operation, such as when the load upon the shovels or scoops is very great, the clutch of one winding drum might not travel into full engagement upon disengagement of the clutch of its cooperating winding drum. To insure full engagement of the clutch elements associated with each of the several winding drums, I provide mechanism for urging the actuating levers in directions to cause engagement of their respective clutches when said levers are moved in a clutch engaging direction. In the preferred embodiment of the invention illustrated, I provide two identical mechanisms one associated with the connected actuator levers 41 and 42 and the other operatively associated with the connected levers 113 and 123. For the sake of brevity but one thereof will be described. With reference particularly to Figs. 3, 6, 7 and 8, a supporting bracket 163 is shown as being bolted or otherwise secured to the side frame member 19 as at 164. A transverse shaft 165 extends through the outer end of the bracket 163 in a direction generally parallel to the frame member 19 and has pivotally secured thereto one end of a toggle arm 166, which at its other end is secured to the adjacent end of a cooperating toggle arm 167 as indicated at 168. A transverse pin 169 extends laterally outwardly from opposite sides of the toggle arm 167 intermediate its ends and through aligned slots 170 in a pair of opposed yoke elements 171 and 172 for compound pivotal and longitudinal sliding movements in said slots. The yoke elements 171 and 172 are welded or otherwise rigidly secured to the bracket 163, see particularly Figs. 7 and 8. A pair of aligned pins or shafts 173 extend laterally outwardly from the free end of the toggle arm in parallel relationship to the shaft 165 and the pivotal connection 168. A pair of coil tension springs 174 are anchored at their opposite ends each to the outer end of one of the pins 173 and an opposite end of the shaft 165 whereby to bias said toggle arms 166 and 167 away from dead center relationship. It should be noted that when the toggle arms 166 and 167 move from their extreme full line position of Fig. 7 to their extreme dotted line position of Fig. 7, that the pivot pin 169 moves from the bottom of the slots 169 toward the top thereof by reason of the fixed location of the shaft 163 in the bracket 163. During this movement, the springs 174 are stretched or extended until the toggle arms reach their "neutral" position of Fig. 7. Continued movement of the toggle arms toward their other extreme position will result from the yielding bias exerted by the springs 174 upon the toggle arms away from dead center relationship. The toggle arms 166 and 167 are connected to the pivotal connection between the lever arm 51 and the link 84 by an articulated member 175 comprising sections 176 and 177, the former of which has one end pivotally connected to the pivotal connection or shaft 168 between the toggle arms and the latter of which is pivotally connected to a yoke 178 that in turn forms the pivotal connection between the lever arm 51 and its cooperating link 84. The sections 176 and 177 are pivotally connected together by a nut-equipped bolt or the like 179. With further reference to Fig. 7 it will be seen that when the toggle arms 166 and 167 are in their full line position, the actuating lever 41 is positioned to render the clutch 36 associated with the winding drum 32 operative. On the other hand, when the toggle arms are moved to the extreme dotted line position of Fig. 7, the clutch 36 associated with the winding drum 33 is rendered operative. It will be noted that the toggle links are moved beyond dead center relationship before the clutch elements become engaged. For this reason there is no danger of any of the clutch operating mechanism from stopping at dead center or at an inoperative position.

When a bin or freight car has been all but emptied with my improved shoveling machine operated automatically, it is desirable to perform the "clean-up" operation in the least possible time. This may be quickly and easily accomplished by arranging the machine for semi-automatic operation. This arrangement is obtained by disconnecting the return cables 13 and 14 from their respective shovels 9 and 10 and permitting said disconnected cables to be wound up on their respective drums 32 and 35. To enable the cables 13 and 14 to be thus wound on their drums, their respective control chains 54 and 121 are manually unwound from their spools 59 and 133 by manipulation of the cranks 60 and 135 thereof to the desired extent. The machine is preferably set in a neutral state when this is done so that the return cables 13 and 14 may be wound upon their drums without disturbing the other parts of the machine including the shovels 9 and 10, the low torque transfer couplings 66 and 108 causing the winding drums 32 and 35 to rotate sufficiently to cause said winding up of the return cables 13 and 14.

Mounted on the frame member 19 adjacent the control lever 42 is a bracket element 180 which pivotally supports intermediate its ends a latch lever 181 as indicated at 182. The latch lever intermediate the pivotal connection 182 and its outer end is provided with an abutment forming notch 183 that is movable into and out of the path of travel of the latch lever 42. A coil tension spring 184 anchored at one end to the frame member 19 and at its other end to the latch lever 181 yieldingly biases said latch lever in a direction to cause the actuator lever 42 to be received in the notch 183, see Fig. 5. A rope or cable 185 has one end attached to the outer end of the latch lever 181 whereby the latch lever may be moved between an actuator lever intercepting position and an inoperative position in spaced relation thereto. The free end of the rope or cable 185 may be secured to any suitable anchoring means, but preferably and as shown, is anchored to a cleat 186 secured to the lower end of a depending frame member 187. The inner end of the latch lever 181 is provided with an upstanding leg 188, to the upper end of which is pivotally mounted a latch dog 189 that is engageable with any one of a plurality of lugs 190 integrally formed with a flange 191 that defines one end of the control drum 73. The latch dog 189 is capable of pivotal movement in a clockwise direction with respect to Fig. 5 but is held against pivotal movement in a counter clockwise direction beyond its position shown by a stop lug 192 on the leg 188. Thus, when the sleeve 72 together with the flange 191 thereon and the winding drum 33 rotates in a counterclockwise direction with respect to Fig. 5 and contrary to the direction of rotation of the shaft 23, the lugs 190 will trip the dog 189 with respect to the leg 188 and the latch lever 181 will not be affected thereby. However, rotation of the sleeve 72 and parts integral therewith are rotated in the direction of the shaft 23 by pressure exerted thereon through the low torque transfer coupling 76, the stop lug 192 will engage the latch dog 189, thereby causing the latch lever 181 to be moved about its pivotal connection 182 and release the actuator lever 42 for outwardly swinging movement whereby to render the clutch 36 associated therewith operative.

A similar latching device is illustrated in Figs. 3 and 5 as being operatively associated with the winding drum 34 and the control drum 100 associated therewith. This mechanism comprises a latch lever 193 pivotally mounted intermediate its ends to a mounting bracket 194 as indicated at 195. As illustrated in Fig. 5, the bracket 194 is mounted to the frame member 19 adjacent the control drum 100 by welding or the like. It will be noted that the latch lever 193 overlies the actuator lever 113 and is provided with an actuator lever engaging abutment forming notch 196 that is movable into and out of the path of travel of the lever 113 upon movements of the latch lever 193 about its pivot axis. A coil tension spring 197 has one end anchored to the bracket 194 and its other end to the outer end of the latch lever 193 and exerts yielding bias to the lever 193 in a direction to engage the actuator lever 113 in said notch 196. At its inner end, the latch lever 193 is provided with a depending leg 198 in which is pivotally mounted, as indicated at 199, a trip dog 200 that is adapted to be engaged by any one of a plurality of tripping lugs 201 projecting radially outwardly from a flange 202 that forms one side of the control drum 100. The dog 200 is free for swinging movements in one direction about the pivot 199 but is limited in rotation in the opposite direction beyond a given point by a stop lug 203 on the lower end of the leg 198. Movement of the winding drum 34 and parts connected thereto including the flange 202 in a counterclockwise direction with respect to Fig. 5 has no affect on the latch lever 193 inasmuch as the trip dog 200 will be moved independently thereof by the tripping lugs 201. On the other hand when the low torque transfer coupling 108 is permitted to impart rotation to the sleeve 101 together with its winding drum 34 and control drum 100, in a clockwise direction with respect to Fig. 5, one of the trip lugs 201 will engage the dog 200 and move the latch lever 193 out of engagement with the actuator lever 113 thereby permitting movement thereof in a direction to render the clutch 97 associated therewith operative. Means for maintaining the latch lever 193 out of the path of travel of the actuator lever 113, so that the machine may be operated automatically, comprises a rope or cable 204 having one end secured to the outer end of the latch lever 193. The rope 204 runs over a pulley 205 and downwardly to a point where it may be easily grasped by the operator and wound around a suitable anchor such as a cleat 206 rigidly secured to the lower end of a depending member 207, see Figs. 5 and 6.

The semi-automatic operation of my novel machine is as follows:

With the return cables 13 and 14 disconnected from their respective shovels 9 and 10 and wound upon their respective drums 32 and 35, or otherwise disposed of, the ropes 185 and 204 are released to place their respective latch levers 181 and 193 in actuator lever engageable positions, and the pins 148 and 155 are placed in the openings 153 and 157 respectively in the control plate 93. This cleaning-up operation, the purpose of which is to remove the final portion of granular material in the car or bin is illustrated in Fig. 4 and requires the use of an operator with each shovel 9 and 10 but dispenses with need for an operator outside of the car or bin. If but one man is available, for the cleanup operation, he may clean first one end of the car and then the other, by using one man for each shovel, both ends of the car may be cleaned or finished simultaneously.

Due to the fact that the low torque transfer couplings are continuously urging the winding drums to rotate in the direction of rotation of their respective shafts, there is always a slight pull upon the pull forward cables 11 and 12. The operators pull the shovels in a direction away from the machine causing the cable drums to rotate counter to the direction of the drive shafts. During this rotation, the trip lugs 190 and 201 trip their respective trip dogs 189 and 200, having no effect on their respective latch levers. Upon reaching the desired distance away from the machine, the operators move the shovels manually toward the machine sufficient to create slack in the pull forward cables 11 and 12, which slack is immediately taken up by rotation of the winding drums 33 and 34 in a cable winding direction imparted thereto by their respective low torque transfer couplings 76 and 108. As soon as one of the lugs 190 and 201 engage their respective trip dogs 189 and 200 in a cable winding direction, the latch levers 181 and 193 are moved in a direction to permit laterally outward movement of their respective actuator levers 42 and 113 to render their respective clutches 36 and 97 operative. The shovels 9 and 10 are then pulled toward the machine and are merely guided by the operators. When the shovels 9 and 10 reach a predetermined position adjacent the door opening 6 in the boxcar 1, or the desired location with respect to the machine, the control chains 77 and 109 will have been wound on their respective control drums 73 and 100 to render their associated clutches 36 and 97 inoperative whereupon the shovels may then again be manually withdrawn for another cycle of operation. It should be noted that the openings 153 and 157 in the control plate 93 are so located that when the pins 151 and 155 are placed therein, that the actuator levers 42 and 113 are moved inwardly only sufficiently far to disengage their respective clutches and not sufficiently far to move their respective toggle arms to the neutral position of Fig. 7. In other words, when said clutches are disengaged, the toggle links 166 and 167 remain on the side of a dead center relationship which permits the springs 174 to urge the actuator levers in a clutch closing direction. When it is desired to again arrange the machine for automatic operation it is merely necessary that the ropes 185 and 204 be utilized to move their respective latch levers 181 and 193 to inoperative positions and to tie said ropes about their respective cleats 186 and 206 thereafter, the locking bars 150 and 154 are arranged as in Figs. 11 and 15 and the return cables 13 and 14 connected to the rear portions of the shovels, and the length of the control chains 54 and 121 adjusted as required. If it is desired to run the drums 32 and 33 independently of the drums 34 and 35, the locking pin 151 can be placed in the opening 152 in its control lever 146 as hereinbefore described.

The modified form of the invention illustrated in Fig. 16, is a single shoveling machine comprising a generally rectangular frame structure 208 which supports bearings 209 that journal a power driven shaft 210. Sleeves 211 and 212 each journalled for rotation on the shaft 210 on opposite sides of a central frame member 213 comprise winding drums 214 and 215 respectively and control drums 216 and 217. For the purpose of the present example it may be assumed that the drum 214 is a return drum having wound thereon a return cable 218, and that the drum 215 is a pull forward drum having wound thereon one end of a pull forward cable 219, both of which cables may be assumed to be connected to opposite sides of a shovel not shown. The sleeves 211 and 212 are frictionally driven under low torque from the shaft 210 by identical low torque transfer couplings 220 that are similar to the low torque transfer coupling 66 shown in Fig. 9. Positive rotation is imparted to the winding drum 214 by a dog clutch 221 comprising clutch elements 222 and 223, the former of which is splined or otherwise secured to the shaft 210 for sliding movements with respect thereto and for common rotation therewith, and the latter of which is integrally formed with the winding drum 214. The winding drum 215 is positively driven from the shaft 210 by a similar clutch 224 comprising a driving element 225 mounted on the shaft 210 in similar fashion to that of the clutch element 222 and a cooperating clutch element 226 mounted on the drum 215. The clutch element 222 is operated by a bell crank actuator lever 227 pivotally secured intermediate its ends to the frame 208 whereas the clutch element 225 is adapted to be moved into engagement by one end of a second bell crank actuator lever 228 pivotally mounted intermediate its ends to the frame structure 208. The bell crank levers 227 and 228 at their adjacent ends are pivotally connected to opposite ends of a rigid link 229 which is pivotally secured to the frame structure 208 for rocking movements as indicated at 230. An elongated flexible member in the nature of a link chain 231 has one end anchored to the control drum 216 and is carried intermediate its ends by the lever 227 in the same manner as the various link chains carried by their respective actuator levers of Fig. 3. The free end of the link chain 231 is wound upon a take-up spool 232 pivotally mounted on the frame 208 for rotation about the axis of the actuator lever 227. A link chain 233 is anchored at its inner end to the control drum 217 and is adapted to be wound thereon. The intermediate portion of the chain 233 is carried by the bell crank lever 228, the outer end thereof being wound upon a take-up spool 234 journalled in the frame 208 for rotation about the axis of pivotal movement of the lever 228. The spools 232 and 234 may be assumed to be identical to the various spools 59, 80, 120 and 133 and are controlled in a manner similar to said spools.

The actuator levers 227 and 228 are yieldingly urged away from a neutral or dead center relationship by toggle mechanism 235 identical to the toggle mechanism shown in Figs. 7 and 8 and connected to the pivotal connection between the actuator lever 227 and the link 229. It should be obvious from the above and with reference to Fig. 16 that when one of the clutches 221 and 224 are rendered operative, the other thereof is simultaneously rendered inoperative. I also provide means for operating the machine of Fig. 16 semi-automatically, said means being indicated diagrammatically at 236 and being identical to the latch lever 181 and the parts associated therewith as illustrated in Fig. 5.

A still further modified form of single shovel machine is illustrated diagrammatically in Fig. 17 wherein a power driven shaft 237 is shown as being journalled in bearings 238 mounted on a generally rectangular supporting frame structure 239. A pair of winding drums 240 and 241 are independently journalled on the shaft 237 in axially spaced relationship and are each adapted to be driven therefrom by a low torque transfer coupling 242 identical to the coupling 66 of Fig. 9, and a high torque transfer coupling comprising a driving clutch element 243 mounted on the driving shaft 237 for common rotation therewith and for axial sliding movements thereon, and driven clutch elements 244 and 245 on the drums 240 and 241 respectively. The clutch element 243 is adapted to be moved selectively into operative engagement with the elements 244 and 245 by means of a bell crank actuator lever 246 pivotally secured to the frame structure 239 as indicated at 247, one arm 248 providing a shifter fork engaging the clutch element 243. Secured to the winding drum 241 for common rotation therewith is a pair of control drums 249 and 250 each having the inner end of a respective link chain 251 and 252 secured thereto. The inner end portions of the chains are adapted to be wound on their respective control drums in opposite directions. The intermediate portion of the link chain 251 being engaged and carried by the arm 253 of the actuator lever 246, the outer end thereof being wound upon a spool 254 rotatably mounted on the frame structure 239 about the axis of the pivot 247. The intermediate portion of the link chain 252 engages and is carried by the outer end of an arm 255 integrally formed with and extending angularly with the lever arm 253. The outer end portion of the chain 252 is wound about a spool 256 that is mounted on a shaft 257 journalled in the frame structure 239. The spools 254 and 256 are identical to the adjustment spools of the preferred form of the invention illustrated and are controlled by mechanisms not shown but similar to the corresponding mechanisms of the preferred form of the invention.

Preferably the drum 241 is utilized as the pull forward drum having adapted to be wound thereon a pull forward cable 258, the drum 240 having a return cable 259 adapted to be wound thereon. The cables are normally attached to a scoop or shovel not shown. In this form of the invention, when the clutch element 243 engages its associated clutch element 245, the cable 258 is wound on the drum 241, the control chain 251 being simultaneously wound on the control drum 249 while the control chain 252 is unwound from the control drum 250. When a predetermined amount of the chain 251 becomes wound on the control drum 249 the actuator lever 246 is moved thereby to disengage the clutch elements 243 and 245 and to engagement of the clutch elements 243 and 244 to reverse the direction of travel of the shovel not shown. The return cable 259 is then caused to be wound on the power driven winding drum 240 while cable 258 is paid out from the drum 241. Obviously the return cable 259 travels through a tail sheave similar to one of the tail sheaves 15 or 16 whereby to cause reverse rotation of the drums 241 and the control drums 249 and 250. During this reverse rotation, the control chain 251 is being unwound from its control drum 249 and the control chain 252 is wound upon its control drum 250. Thus, when sufficient chain 252 is wound upon the control drum 250 the actuator lever 246 is moved thereby in a direction to disengage the drum 240 and engage the drum 241, whereby the cycle is repeated. Obviously, this form of the invention may be operated semi-automatically by addition of one of the latch lever mechanisms illustrated in Fig. 5.

In the modification of the invention illustrated in Fig. 18, a frame structure is illustrated as comprising a pair of generally rectangular frames 260 and 261 provided with suitable bearings 262 which journal power driven shafts 263 and 264 respectively. A winding drum 265 is journalled on the shaft 263 and is provided with a low torque transfer coupling 266 identical to the coupling 66. The drum 265 is adapted to be positively driven from the shaft 263 by a dog clutch comprising driving and driven clutch elements 267 and 268 respectively, the former being splined or otherwise secured to the shaft 263 and the latter being rigidly secured to the drum 265. A cable 269 is adapted to be wound on the drum 265 and connected to a scoop or shovel not shown. An actuator in the nature of a bell crank lever 270 is pivotally secured intermediate its ends to the frame 260 as indicated at 271. One arm 272 of the bell crank 270 provides a shifter fork for the clutch element 267, the other arm 273 of the bell crank engaging the intermediate portion of a control chain 274 which has its inner end anchored to and adapted to be wound on a control drum 275 that is journalled for rotation on the shaft 263. The control drum 275 is also provided with a low torque transfer coupling 276 identical with the low torque transfer coupling 66 and is provided at one end with a clutch element 277 that is engageable with a cooperating clutch element 278 connected to the winding drum 265. A shifter lever 279 is engageable with the control drum 275 to move the same into and out of engagement with the winding drum 265. The shifter lever 279 is pivotally secured to the frame 260 as indicated at 280 and is yieldingly biased in a direction to move the control drum 275 into driving engagement with the winding drum 265 by a coil tension spring 281. Means for moving the control drum 275 out of engagement with the winding drum 265 comprises a solenoid 282, the armature 283 of which is connected to the shifter lever 279. The intermediate portion of the control chain 274 is engaged and carried by the arm 273 of the bell crank 270 in a manner similar to that shown in Figs. 3 and 6. The outer end of the control chain is adapted to be wound on a spool 284 that is mounted on the frame 260 for rotation about the axis of the pivotal connection 271. A coil compression spring 285 interposed between one end of the frame 260 and the lever arm 272 exerts yielding bias on the clutch element 267 in the direction of its cooperating clutch element 268.

A second winding drum 286 is journalled on the shaft 264 and has one end of a cable 287 wound thereon. The other end of the cable 287 is adapted to be connected to the other side of the shovel not shown. A control drum 288 is connected to the winding drum 286 for common rotation therewith and a transfer coupling 289 similar to the transfer coupling 66 provides a low torque transfer between the shaft 264 and the drums 286 and 288. A high torque transfer coupling for said drums 286 and 288 comprises a driving clutch element 290 splined or otherwise secured to the shaft 264 and a driven clutch element 291 rigidly secured to the drum 286. An actuator in the nature of a bell crank lever 292 comprises a relatively short arm 293 which provides a shifter fork engaging the driving clutch element 290, and a relatively long lever arm 294 which engages and carries the intermediate portion of a control chain or the like 295 that has its inner end anchored to and wound upon the control drum 288. The outer end of the chain 295 is wound on a spool 296 that is journalled in the frame 261.

The outer ends of the lever arms 273 and 294 are adapted to be connected by a rigid thrust link or bar 297 that is pivotally secured to the outer end of the lever arm 294 and abuts the outer end portion of the lever arm 273. The thrust link 297 is limited in one direction of its pivotal movement by a stop lug or the like 294' on the adjacent end of the lever arm 294, and is provided with an inwardly extended portion 297' to which is anchored one end of a coil tension spring 297'', the other end of which is suitably anchored to the intermediate portion of the lever arm 294. The spring 297'' yieldingly urges the thrust link 297 in one direction of swinging movement toward the stop lug 294' and toward abutting engagement of the free end of the thrust link 297 with the lever arm 273 of the bell crank 270. A link chain 298 has one end anchored to the bar 297 and has its other end wound on a spool 299 that is mounted on a shaft 300 pivoted on the frame 261 and which forms the pivot axis for the bell crank lever 292. A coil compression spring 301 yieldingly biases the bell crank lever 292 in a direction to cause engagement of the clutch elements 290 and 291. The spools 271, 296 and 299 are identical to the spools used for similar purposes in the preferred form of the invention illustrated and may be assumed to be provided with control handles or cranks for manipulating the same. When the chain 298 is wound upon the spool 299 to a predetermined extent, the link or connecting bar 297 will be swung thereby out of engagement with the lever arm 273, so that the two winding drums may be operated independently of each other. The solenoid 282 when energized, moves the control drum 275 out of engagement with the winding drum 265, whereupon the winding drum may be operated to cause the cable 269 to be wound entirely thereon without changing the setting or the effective length of the control chain 274 when it is desired to utilize only the winding drum 286 and its cable 287.

A latch lever 302 is mounted on the frame 260 and is similar to one of the latch levers illustrated in Fig. 5. Preferably however, the latch lever 302 is devoid of the rope associated with the latch mechanisms of Fig. 5 and is at all times adapted to be engageable with trip lugs on a flange 303 on the control drum 275. A latch lever 304 pivotally mounted on the frame 261 is identical to the latch lever 302 and is engageable with trip lugs on a flange 305 on the control drum 288. The latch levers 302 and 304 engage their respective lever arms 273 and 294 during their movement toward clutch engaged positions and hold the same against such movement until tripped by the trip lugs on their respective flanges 303 and 305. With this arrangement, during automatic operation of this form of the invention, the scoop or shovel, not shown, is given sufficient time at the end of its return travel to settle substantially into the granular material, and is enabled thereby to remove a capacity load with each forward travel toward the delivery point. It will be noted that this time delay arrangement may be also used in the preferred form of the invention illustrated in Figs. 1 to 15 inclusive.

My invention has been thoroughly tested and found to be completely satisfactory for the accomplishment of the objectives set forth; and while I have shown a preferred form of my novel shoveling machine and several modifications, it will be understood that the same is capable of still further modification without departure from the spirit and scope of the invention as defined in the claims.

What I claim is:

1. In a device of the class described, a rotary shaft, a winding drum journalled on said shaft, a clutch comprising driving and driven elements one on said shaft and the other on said drum, clutch operating mechanism including an actuator for moving one of said elements into and out of operative engagement with the other thereof, a control drum journalled on the shaft and connected to said winding drum for common rotation therewith, and an elongated flexible member having one end anchored to said control drum for winding thereon under rotation of the control drum in one direction, said flexible member intermediate its ends engaging said actuator and shiftable with respect thereto whereby to change the length of the portion thereof between said actuator and the end of said flexible member secured to the control drum, winding of said flexible member upon said control drum causing movement of the actuator in a direction to disengage said clutch elements.

2. In a device of the class described, a frame structure, a rotary shaft journalled in said frame structure, a winding drum journalled on said shaft, a clutch comprising driving and driven elements one on said shaft and the other on said drum, clutch operating mechanism including a lever for moving one of said elements into and out of operative engagement with the other thereof, a control drum journalled on the shaft and connected to said winding drum for common rotation therewith, an elongated flexible tie member having one end anchored to said control drum for winding thereon under rotation of said control drum in one direction, said tie member intermediate its ends engaging said lever, and mechanism for shifting said tie member with respect to said lever, whereby to change the length of the portion of said tie member between said lever and the end secured to said control drum, winding of said tie member upon said control drum causing movement of said lever in a direction to disengage said clutch.

3. In a device of the class described, a rotary shaft, a winding drum mounted for rotation on the shaft, cooperating clutch elements on said shaft and drum for transferring rotary movements of the shaft to the drum, operating mechanism for one of the clutch elements including a lever movable in opposite directions to engage and disengage said clutch elements, a control drum rotatable on said shaft in common with said winding drum, and an elongated flexible member carried by said lever and having one end portion wound on said control drum, and means for varying the effective length of the flexible member between its connection to said control drum and said lever, said means comprising a spool upon which the opposite end portion of the flexible member is wound, and mechanism for releasably locking said spool against rotation with respect to said lever, said lever being moved by winding of said flexible member on the control drum to a predetermined degree to disengage said clutch elements.

4. In a device of the class described, a frame structure, a rotary shaft journalled in the frame structure, a winding drum mounted for rotation on the shaft, a clutch comprising driving and driven elements one on said shaft and the other on said drum, clutch operating mechanism including a lever pivoted on said frame structure and operative to move one of said elements into and out of engagement with the other thereof, a control drum rotatable on said shaft and connected to said winding drum for common rotation therewith, an elongated flexible tie member carried by said lever and having one end portion wound on said control drum, and means for varying the effective length of the flexible member between its connection to the control drum and said lever, said means comprising a winding spool journalled for rotation about the axis of pivotal movement of said lever and upon which the opposite end portion of said flexible member is wound, and mechanism for releasably locking said spool against rotation with respect to the lever, said lever being moved by winding of said flexible member on said control drum to a predetermined degree to disengage said clutch elements.

5. The structure defined in claim 4 in which said lever is provided with a supporting element carrying said flexible member and guiding the same for movements relative to the lever upon release of said spool for rotation relative to the lever.

6. In a device of the class described, a frame structure, a winding drum journalled for rotation on the frame structure, a drive shaft, power transmission mechanism connecting said drive shaft to said winding drum, said power transmission mechanism including a low torque transfer coupling comprising a shaft-engaging friction element connected to the drum, a releasable high torque transfer coupling connecting the drive shaft to the drum, and operating mechanism for said high torque transfer coupling, said operating mechanism comprising an actuator, a control drum journalled for common rotation with said winding drum, and an elongated flexible tie member having one end anchored to said control drum for winding on said control drum under rotation thereof in one direction, said tie member intermediate its ends engaging said actuator and shiftable with respect thereto whereby to change the length of the portion thereof between said actuator and the end of said tie member secured to the control drum, winding of said tie member upon said control drum imparting movement of the actuator in a direction to release said high torque transfer coupling, said low torque transfer coupling exerting yielding bias to said actuator through said tie member in a high torque transfer coupling releasing direction to maintain the same released.

7. In a device of the class described, a frame structure, shaft means journalled on the frame structure, a pair of winding drums journalled for independent rotation on the shaft means, a pair of clutches each comprising driving and driven elements, one on said shaft means and the other on a different one of said drums, clutch operating mechanism including a pair of actuators one for each of said clutches, a pair of control drums journalled on the shaft means each for common rotation with a different one of said winding drums, a pair of elongated flexible tie members each having one end anchored to a different control drum and for winding thereon under winding rotation of its cooperating winding drum and each engaging a respective actuator, whereby when one tie member is being wound upon its control drum the other tie member is unwound from its control drum, winding of each of said tie members on their respective control drums causing movement of their respective control drums causing movement of their respective actuators in directions to render said clutches inoperative, and linkage connecting said actuators for common movements in opposite directions, whereby when one of said actuators moves to render one of said clutches inoperative the other of said actuators will be moved by said one thereof in a direction to render its respective clutch operative.

8. In a device of the class described, a frame structure, shaft means journalled on the frame structure, first and second winding drums journalled for independent rotation on the shaft means, a pair of clutches each comprising driving and driven elements, one on said shaft means and the other on a different one of said drums, clutch operating mechanism including a pair of actuators one for each of said clutches, a pair of control drums journalled on the shaft means each for common rotation with a different one of said winding drums, a pair of elongated flexible tie members each having one end anchored to a different control drum for winding thereon under winding rotation of its cooperating winding drum, said tie members intermediate their ends each engaging a respective actuator and shiftable with respect thereto to change the length of the portions of the tie members between their respective actuators and control drums, the arrangement being such that when one tie member is being wound upon its control drum the other tie member is unwound from its control drum, winding of each of said tie members on their respective control drums causing movement of their respective actuators in directions to render said clutches inoperative, and linkage connecting said actuators for common movements in opposite directions, whereby when one of said actuators moves to render its respective clutch inoperative the other of said actuators will be moved by said one thereof in a direction to render its respective clutch operative.

9. The structure defined in claim 7 in further combination with means for releasably locking one of said actuators against movement in a direction to render its respective clutch operative but permitting movement of the other of said actuators in directions to render its respective clutch operative or inoperative, said means comprising a latch engageable with said one of the actuators, a pair of cooperating latch releasing elements, and means mounting the latch releasing elements one on said latch and the other for common rotation with the winding drum operatively coupled to said one of the actuators, said elements cooperating to release said latch upon rotation of its respective winding drum in one direction only.

10. In a device of the class described, a frame structure, shaft means journalled on the frame structure, first and second winding drums journalled for independent rotation on the shaft means, power operated mechanism for imparting continuous rotary movements to said shaft means in one direction, a pair of clutches each comprising cooperating driving and driven clutch elements one on said shaft means and the other on said drums for transferring rotary movements of the shaft means to the drums, clutch operating mechanism including a pair of actuating levers one for each of said clutches, said levers being pivotally mounted on said frame structure and each movable in opposite directions to engage and disengage their respective clutch elements, a pair of control drums journalled on the shaft means each for common rotation with a different one of said winding drums, a pair of elongated flexible members each carried by one of said levers and each having one end portion wound on a different one of said control drums, and means for varying the effective length of said flexible members between their connections to their respective control drums and levers, said last-mentioned means comprising a pair of spools each carried by a different one of said levers and upon which the opposite end portions of said flexible members are wound, mechanism for releasably locking said spools against rotation relative to their respective levers, said levers being moved by winding of their respective flexible members on their respective control drums to a predetermined degree to disengage the clutch elements operatively coupled thereto, and linkage connecting said levers for common movements in opposite directions whereby when one of said levers is moved in a direction to disengage its respective clutch element, the other of said levers will be moved by said one thereof in a direction to cause engagement of the clutch elements controlled thereby.

11. The structure defined in claim 10 in which said levers comprise bell cranks pivotally secured to the frame structure intermediate their ends, and in which said spools are mounted for rotary movements about the axis of pivotal movement of their respective levers.

12. In a device of the class described, a frame structure, a pair of laterally spaced parallel shafts journalled on the frame structure, power operated mechanism for imparting continuous and uninterrupted rotation to said shafts, a pair of winding drums each journalled for independent rotation on a different one of said shafts, a pair of clutches each comprising driving and driven elements, one on a different one of said shafts and the other on a different one of the drums journalled thereon, clutch operating mechanism including a pair of actuators one for each of said clutches, a pair of control drums each journalled on a different one of said shafts for common rotation with the winding drums thereon, a pair of elongated flexible tie members each having one end anchored to a different control drum for winding thereon under winding rotation of its cooperating winding drum and each engaging a different one of said actuators, whereby when one tie member is being wound upon its control drum the other tie member is unwound from its control drum, winding of each of said tie members on their respective control drums causing movement of their respective actuators in directions to render said clutches inoperative, and linkage connecting said actuators for common movements in opposite directions, whereby when one of said actuators moves to render one of said clutches inoperative the other of said actuators will be moved by said one thereof in a direction to render its respective clutch operative.

13. In a device of the class described, a frame structure, a pair of laterally spaced parallel shafts journalled on the frame structure, power operated mechanism for imparting continuous and uninterrupted rotation to said shafts, a pair of winding drums each journalled for independent rotation on a different one of said shafts, a pair of clutches each comprising driving and driven elements, one on a different one of said shafts and the other on a different one of the drums journalled thereon, clutch operating mechanism including a pair of actuators one for each of said clutches, a pair of control drums each journalled on a different one of said shafts for common rotation with the winding drums thereon, a pair of elongated flexible tie members each having one end anchored to a different control drum for winding thereon under winding rotation of its cooperating winding drum, said tie members intermediate their ends each engaging a different one of said actuators and shiftable with respect thereto to change the length of the portions of the tie members between their respective actuators and control drums, whereby when one tie member is being wound upon its control drum the other tie member is unwound from its control drum, winding of each of said tie members on their respective control drums causing movement of their respective actuators in directions to render said clutches inoperative, and linkage connecting said actuators for common movements in opposite directions, whereby when one of said actuators moves to render its respective clutch inoperative the other of said actuators will be moved by said one thereof to render its respective clutch operative.

14. In a device of the class described, a frame structure, a pair of laterally spaced parallel shafts journalled on the frame structure, power operated mechanism for imparting continuous and uninterrupted rotation to said shafts, a pair of winding drums each journalled for independent rotation on a different one of said shafts, a pair of clutches comprising cooperating clutch elements on said shafts and said drums for transferring rotary movements of the shafts to their respective drums, clutch operating mechanism including a pair of actuating levers one for each of said clutches, said levers being pivotally mounted on said frame structure and each movable in opposite directions to engage and disengage their respective clutch elements, a pair of control drums each journalled on a different shaft and coupled to the winding drums thereon for common rotation therewith, a pair of elongated flexible members each carried by one of said levers and each having one end portion wound on a different one of said control drums, means for varying the effective length of said flexible members between their connections to their respective control drums and levers, said means comprising a pair of spools each carried by a different one of said levers and upon which the opposite end portions of said flexible members are wound, mechanism for releaseably locking said spools against rotation relative to their respective levers, being moved by winding of their respective flexible members on their respective control drums to a predetermined degree to disengage their respective clutch elements and linkage connecting said levers for common movements in opposite directions, whereby when one of said levers is moved in a direction to disengage its respective clutch element the other of said levers will be moved by said one thereof in a direction to cause engagement of its respective clutch elements.

15. The structure defined in claim 14 in further combination with means for releaseably locking one of said levers against movement in a direction to cause engagement of its respective clutch elements but permitting movement of the other of said levers in opposite directions to cause engagement or disengagement of its respective clutch elements, said means comprising a latch engageable with said one of the levers, a pair of cooperating latch releasing elements, means mounting the latch releasing elements one on said latch and the other for common rotation with the winding drum operatively coupled to said one of the levers, said elements cooperating to release said latch upon rotation of its respective winding drum in one direction only, and manually operated means for moving and anchoring said latch out of the path of travel of said lever.

16. In a device of the class described, a frame structure, a rotary shaft journalled on the frame structure, a pair of winding drums journalled for independent rotation on said shaft in axially spaced relationship, a pair of clutches each comprising cooperating driving and driven clutch elements on said shaft and said drums respectively, clutch operating mechanism including a pair of actuators one for each of said clutches, a pair of control drums journalled on said shaft each for common rotation with a different one of said winding drums, a pair of elongated flexible members each having one end anchored to a different control drum for winding thereon under winding rotation of its cooperating winding drum and each engaging a different one of said actuators, whereby when one tie member is being wound upon its control drum the other tie member is unwound from its control drum, winding of each of said tie members on their respective control drums causing movement of their respective actuators in directions to render said clutches inoperative, and linkage connecting said actuators for common movements in opposite directions, whereby when one of said actuators moves to render one of said clutches inoperative the other of said actuators will be moved by said one thereof to render its respective clutch operative.

17. In a device of the class described, a frame structure, a drive shaft journalled on the frame structure, a pair of winding drums journalled for independent rotation on said shaft in axially spaced relationship, power operated mechanism for imparting continuous rotary movement to said shaft in one direction, a pair of clutches comprising cooperating driving and driven elements on said shaft and said drums respectively, clutch operating mechanism including a pair of actuating levers one operatively connected to each of said clutches, said levers being pivotally mounted on said frame structure and each movable in opposite directions to engage and disengage their respective clutch element, a pair of control drums each connected to a different one of said winding drums for common rotation therewith, a pair of elongated flexible members each carried by one of said levers and each having one end portion wound on a different one of said control drums, and means for varying the effective length of said flexible members between their connections to their respective control drums and levers, said last-mentioned means comprising a pair of spools each carried by a different one of said levers and upon which the opposite end portions of said flexible members are wound, mechanism for releasably locking said spools against rotation relatively to their respective levers, said levers being moved by winding of their respective flexible members on their respective control drums to a predetermined degree to disengage the clutch elements operatively connected therewith, and linkage connecting said levers for common movements in opposite directions whereby when one of said levers is moved in a direction to disengage its respective clutch element, the other of said levers will be moved by said one thereof in a direction to cause engagement of its respective clutch elements.

18. The structure defined in claim 17 in which said levers comprise bell cranks pivotally secured to the frame structure intermediate their ends, and in which said spools are mounted for rotary movements about the axis of pivotal movement of their respective levers.

19. In a device of the class described, a frame structure, a drive shaft journalled in the frame structure, a pair of winding drums journalled on said shaft in spaced relation, a load-carrying cable having its opposite ends connected each to a different one of said winding drums whereby to be partially wound alternately on said drums, power transmission mechanism connecting said drive shaft alternately to said drums to impart cable winding rotation thereto, said mechanism comprising a driving clutch element on said shaft and a driven clutch element on each of said drums, clutch operating mechanism including an actuator for said driving element, a pair of control drums journalled on said shaft and connected to one of said winding drums for common rotation therewith, an elongated flexible member having one end anchored to one of said control drums for winding thereon upon rotation thereof in one direction, a second elongated flexible member having one end anchored to the other of said control drums and adapted to be wound thereon upon rotation thereof in the opposite direction, said flexible members engaging said actuator at spaced points thereon, winding of each of said flexible members on their respective control drums causing movement of said actuator in opposite directions to cause disengagement of said driving clutch element with one of said driven elements and engagement of said driving element with the other of said driven elements, said cable being arranged to cause rotation of the disengaged winding drum in a direction opposite to the direction of rotation of said shaft when the other of said winding drums is in driving engagement with said shaft.

20. In a device of the class described, a frame structure, a drive shaft journalled in the frame structure, a pair of winding drums journalled on said shaft in spaced relation, a load-carrying cable having its opposite ends connected each to a different one of said winding drums and adapted to be partially wound alternately on said drums, power transmission mechanism connecting said drive shaft alternately to said drums to impart cable winding rotation thereto, said mechanism comprising a driving clutch element on said shaft and a driven clutch element on each of said drums, clutch operating mechanism including a lever pivotally secured to said frame structure, a pair of control drums journalled on said shaft and connected to one of said winding drums for common rotation therewith, an elongated flexible member having one end anchored to one of said control drums for winding thereon upon rotation thereof in one direction, a second elongated flexible member having one end anchored to the other of said control drums for winding thereon upon rotation thereof in the opposite direction, said flexible members engaging said lever in spaced points thereon and being carried thereby, means for changing the length of said flexible members between their respective drums and said lever and comprising a pair of spools journalled on said frame structure, each of said spools having the free end of one of said flexible members wound thereon, one of said spools being carried by said lever and rotatable about the pivot axis of said lever, means releaseably locking said one of the spools against rotation with respect to said lever, the other of said spools being releasably locked against rotation relative to said frame, winding of each of said flexible members on their respective control drums causing movement of said lever in opposite directions to cause disengagement of said driving clutch element with one of said driven elements and engagement of said driving element with the other of said driven elements, said cable being arranged to cause rotation of the disengaged winding drum in a direction opposite to the direction of rotation of said shaft when the other of said winding drums is in driving engagement with said shaft.

21. In a device of the class described, a frame structure, drive shaft means journalled in the frame structure, a pair of winding drums journalled on the shaft means for independent rotation, a pair of clutches each comprising driving elements on the shaft means and driven elements one on each of said winding drums, clutch operating mechanism including a pair of actuators on the frame structure each operatively coupled with a different one of said clutches and operative to cause engagement and disengagement of their respective clutch elements, linkage connecting said actuators for common movements in opposite directions, whereby when the clutch elements of one of said drums are engaged, the clutch elements of the other of said drums are disengaged, means operatively coupled with said winding drums and actuators for automatically disengaging one of said clutches when one of said winding drums is rotated to a predetermined extent in a winding direction, and manually operated mechanism for limiting movement of said linkage in a direction to engage the other of said clutches when one thereof is disengaged, said manually operated mechanism comprising a lever connected to said linkage for common movements therewith and a displaceable stop member located in the path of travel of said lever, engagement of said lever with said stop member permitting rotation of both of said drums independently of said shaft means.

22. In a device of the class described, a frame structure, drive shaft means journalled in the frame structure, power operated means for imparting continuous and uninterrupted rotation to said drive shaft means, first and second pairs of winding drums journalled on the drive shaft means, a plurality of clutches each coupling the drive shaft means with a different one of said winding drums, clutch operating mechanism comprising a plurality of actuators each coupled to a different one of said clutches and movable in opposite directions to render their respective clutches operative and inoperative, linkage connecting the actuators for the first pair of drums together for common movements in opposite directions to render the clutch of one thereof operative when the clutch of the other thereof is rendered inoperative, linkage connecting the actuators of the second pair of drums for common movements in opposite directions to render the clutch of one thereof operative when the clutch of the other thereof is rendered inoperative, means operatively coupling the winding drums of each pair thereof to the actuators of each pair for automatically rendering one of the clutches of each pair of drums inoperative when the drum coupled thereto is rotated to a predetermined extent in a winding direction, and mechanism connecting the linkage of one pair of said winding drums with the linkage of said other pair for common movements of said linkages, said last-mentioned mechanism including a locking element operative to release said linkages for independent movements whereby said pairs of drums may be operated independently of each other.

23. In a device of the class described, a frame structure, a pair of laterally spaced parallel drive shafts journalled in the frame structure, power operated means for imparting continuous and uninterrupted rotation to said drive shafts, a first pair of winding drums each journalled on a different one of said shafts, a second pair of winding drums each journalled on a different one of said shafts in spaced relation to said first pair, a plurality of clutches each comprising a driving element on one of said shafts and a cooperating driven element on one of said drums, clutch operating mechanism including a plurality of actuators mounted on the frame structure and each operatively coupled to a different one of said clutches and operative to cause engagement and disengagement of their respective clutch elements, linkage connecting the actuators coupled to said first pair of drums for common movements in opposite direction to cause engagement of the clutch elements of one thereof when the clutch elements of the other thereof are disengaged, other linkage operatively coupled to said second pair of drums and connecting the actuators thereof for common movements in opposite directions to cause engagement of the clutch elements of one of the second pair of drums when the clutch elements of the other thereof are disengaged, means operatively coupling the winding drums of each pair thereof to the actuators of each pair to automatically disengage one of the clutches of each pair of drums when one of each thereof is rotated to a predetermined extent in a winding direction, and mechanism connecting the linkage of one pair of said winding drums with the linkage of said other pair for common movements of said linkages, said last-mentioned mechanism including a locking element operative to release said linkages for independent movement whereby said pairs of drums may be operated independently of each other.

24. The structure defined in claim 22 in which each of said actuators comprises a lever pivotally mounted on the frame structure and in which said means for automatically rendering one of the clutches of each pair of drums inoperative when the drum driven through said one of the clutches is rotated to a predetermined extent in a winding direction includes a plurality of control drums each connected for common rotation with a different winding drum and a plurality of elongated flexible members each carried by a different one of said levers and each having one end portion wound on a respective control drum, and in further combination with means for varying the effective length of each flexible member between its connection to its respective control drum and lever, said means comprising a plurality of spools, one each mounted on each of said levers for rotation on the pivot axis thereof and upon which the opposite end of a respective flexible member is wound, and mechanism for releaseably locking each of said spools against rotation relative to their respective levers.

25. The structure defined in claim 22 in which said linkages each comprise a pair of rigid links pivotally connected to each other at their inner ends and each to a respective actuator at their outer ends, a crank arm pivotally connected at its outer end to the pivot connection between said links, a rock shaft fast on the inner end of the crank arm and journalled in the frame structure, said rock shaft and crank arm supporting the inner ends of said links, a pair of control levers one each on the rock shaft of a different pair of said links, the adjacent inner ends of said control levers being movable toward and away from overlapping relationship and having alignable apertures therein, the apertures in one of said control levers being elongated to provide a slot, said locking element comprising a locking bar pivotally mounted at one end on one of said rock shafts and a pin projecting laterally outwardly from the free end portion of said bar, said pin being insertable through the apertures in said control levers, whereby actuator imparted movement of one of said control levers will cause corresponding movement of the other thereof.

26. The structure defined in claim 25 in further combination with a control plate mounted on the frame structure adjacent said control levers, said control plate having a pin-receiving aperture therein, said aperture being so orientated that when the pin is received therein, said pin will be located in the path of travel of its respective control lever whereby to limit the amount of swinging movement thereof in one direction.

27. The structure defined in claim 7 in further combination with means urging said other one of the actuators in a direction to render its associated clutch operative when the clutch controlled by said one actuator is rendered inoperative, said means comprising a pair of cooperating toggle arms, means pivotally connecting the free end of one of said arms to the frame structure, means intermediate the ends of the other of said arms mounting the same to the frame structure for compound pivotal and longitudinal sliding movements with respect thereto, yielding means biasing said toggle arms away from dead center relationship, and an articulated member connected at one end to the connection between said toggle arms and at its other end to one of the actuators, said toggle arms being moved over dead center relationship by one of said flexible members during movement imparted thereby to said one actuator toward its clutch inoperative position.

28. The structure defined in claim 14 in further combination with means urging said levers selectively in opposite directions, whereby when the clutch elements of one thereof are disengaged the clutch elements of the other thereof will be yieldingly biased toward engagement, said means comprising a pair of cooperating toggle arms, means pivotally connecting the free end of one of said arms to the frame structure, means connecting the intermediate portion of the other of said arms to the frame structure for compound pivotal and longitudinal sliding movements with respect thereto, yielding means biasing said toggle arms away from dead center relationship, and an articulated member connected at one end to the connection between said toggle arms and at its other end to said levers, said toggle arms being moved over dead center relationship by one of said flexible members during movement imparted thereby to its respective lever in the direction of its clutch disengaged position.

29. The structure defined in claim 28 in which the means connecting the intermediate portion of said other toggle arm to the frame structure includes a bracket secured to the frame structure, said bracket having an elongated slot therein, and a pin rigidly anchored to said other toggle arm and movable in said slot, said yielding means comprising a spring anchored at one end to the pivotal connection of said one of the arms to the frame structure and at its other end to the free end portion of said toggle arm.

30. In a device of the class described, a frame structure, shaft means journalled in the frame structure, a pair of winding drums journalled for independent rotation on the shaft means, a pair of clutches each operatively coupling said shaft means to a different one of said drums, clutch operating mechanism including a pair of actuators one for each of said clutches, a pair of control drums journalled on the shaft means, one of said control drums being anchored to one of said winding drums for common rotation therewith, means releasably locking the other of said control drums to the other winding drum for common rotation therewith, a pair of elongated flexible tie members each having one end anchored to a different control drum for winding thereon under winding rotation of its cooperating winding drum and each engaging the actuator for its respective winding drum, linkage connected to one of said actuators and engaging the other thereof for common movements in one direction, yielding means biasing said actuators for movement in directions to render their respective clutches operative, and mechanism for disengaging said linkage from one of the actuators whereby the clutch of one of the winding drums may be operated independently of the other thereof, a pair of low torque transfer couplings each operatively coupled to a different one of said winding drums, and control means for the means releasably locking said other control drum to its respective winding drum, release of said other control drum by said control means permitting a cable to be wound on said other winding drum upon rotation imparted thereto by said low torque transfer coupling and independently of its control drum and the other winding drum.

31. The structure defined in claim 30 in which the shaft means comprises a pair of shafts journalled in the frame structure in spaced parallel relationship, each of said winding drums together with their respective control drums being journalled on a different shaft, said actuators comprising bell crank levers one arm of each of which engages its respective clutch and the other arm of each of which is connected to its respective tie member, and in further combination with means for varying the effective length of the tie members between their respective control drums and levers, said last-mentioned means including a pair of spools journalled on the frame structure and on each of which is wound the free end of a respective tie member and mechanism releasably locking said spools against tie member releasing rotation.

32. In a device of the class described, a rotary shaft, a winding drum journalled on said shaft, a clutch comprising driving and driven elements one on said shaft and the other on said drum, clutch operating mechanism including an actuator for moving one of said elements into and out of operative engagement with the other thereof, a control drum journalled on the shaft, means detachably securing the control drum to said winding drum for common rotation therewith, and an elongated flexible member having one end anchored to said control drum for winding thereon under rotation of the control drum in one direction, said flexible member intermediate its ends engaging said actuator and shiftable with respect thereto whereby to change the length of the portion thereof between said actuator and the end of said flexible member secured to the control drum, winding of said flexible member upon said control drum causing movement of the actuator in a direction to disengage said clutch elements.

33. The structure defined in claim 32 in further combination with yielding means urging said actuator in a clutch engaging direction.

34. In a device of the class described, a frame structure, a winding drum journalled for rotation on the frame structure, a drive shaft, power transmission mechanism connecting said drive shaft to said winding drum, said power transmission mechanism including a releasable high torque transfer coupling connecting the drive shaft to the drum, operating mechanism for said high torque transfer coupling, said operating mechanism comprising an actuator, a control drum journalled for common rotation with said winding drum, an elongated flexible tie member having one end anchored to said control drum for winding thereon under rotation of the control drum in one direction, said tie member intermediate its ends engaging said actuator and shiftable with respect thereto whereby to change the length of the portion thereof between said actuator and the end of said tie member secured to the control drum, a low torque transfer coupling comprising a shaft engaging friction element connected to one of said drums, and means releasably securing the control drum to the winding drum for common rotation therewith, winding of said tie member upon said control drum imparting movement of said actuator in a direction to release said high torque transfer coupling, said low torque transfer coupling exerting yielding bias to said actuator through said tie member in a high torque transfer coupling releasing direction to maintain the same released.

35. The structure defined in claim 34 in which said friction element is mounted on said control drum whereby to maintain the same in low torque engagement with said shaft when the control drum is disconnected from said winding drum.

36. The structure defined in claim 30 in which said linkage includes a thrust link detachably pivotally secured to one of said actuators and movable into and out of operative engagement with the other thereof.

37. The structure defined in claim 36 in further combination with yielding means urging said thrust link toward engagement thereof with said other actuator.

References Cited in the file of this patent

UNITED STATES PATENTS

| | | |
|---|---|---|
| 92,250 | Beattie | July 6, 1869 |
| 317,083 | Bradford | May 5, 1885 |